(12) United States Patent
Ellisor et al.

(10) Patent No.: US 12,049,889 B2
(45) Date of Patent: *Jul. 30, 2024

(54) PACKING BORE WEAR SLEEVE RETAINER SYSTEM

(71) Applicant: Vulcan Industrial Holdings, LLC, Houston, TX (US)

(72) Inventors: Kyle Matthew Ellisor, Katy, TX (US); Akhil Alex, Houston, TX (US); Benjamin Scott Berryhill, Houston, TX (US); Chance Ray Mullins, Spring, TX (US); Steven Zachary Newberg, Houston, TX (US); Chris Leake, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/890,975

(22) Filed: Aug. 18, 2022

(65) Prior Publication Data

US 2022/0390055 A1 Dec. 8, 2022

Related U.S. Application Data

(63) Continuation-in-part of application No. 16/916,593, filed on Jun. 30, 2020, now Pat. No. 11,421,680.

(51) Int. Cl.
*F04B 53/16* (2006.01)
*F04B 1/0421* (2020.01)
(Continued)

(52) U.S. Cl.
CPC .......... *F04B 53/168* (2013.01); *F04B 1/0421* (2013.01); *F04B 53/166* (2013.01); *F04B 53/22* (2013.01); *F16L 55/1011* (2013.01)

(58) Field of Classification Search
CPC ................. F04B 53/168; F16J 10/04
(Continued)

(56) References Cited

U.S. PATENT DOCUMENTS

| 1,316,539 A | 9/1919 | Ford |
| 1,364,848 A | 1/1921 | Walsh |

(Continued)

FOREIGN PATENT DOCUMENTS

| CN | 201149099 | 11/2008 |
| CN | 102748483 | 10/2012 |

(Continued)

OTHER PUBLICATIONS

U.S. Appl. No. 16/814,267, 194 pages.
(Continued)

*Primary Examiner* — Michael Leslie
(74) *Attorney, Agent, or Firm* — Womble Bond Dickinson (US) LLP

(57) ABSTRACT

A fluid end includes a housing having a bore extending toward a cavity and a wear sleeve positioned within the bore. The fluid end also includes a plunger positioned within a plunger bore extending through the wear sleeve, the plunger reciprocating within the plunger bore. The fluid end further includes a wear sleeve retainer coupled to the housing and positioned to block axial movement of the wear sleeve, the wear sleeve retainer having external threads along a body that engage internal threads formed in the housing. The fluid end also includes an anti-rotation system, coupled to the housing, the anti-rotation system engaging the wear sleeve retainer to block rotation of the wear sleeve retainer in at least one direction. The fluid end further includes a packing nut coupled to the wear sleeve retainer.

20 Claims, 21 Drawing Sheets

(51) Int. Cl.
  *F04B 53/22* (2006.01)
  *F16L 55/10* (2006.01)
(58) Field of Classification Search
  USPC .................................................. 92/128, 171.1
  See application file for complete search history.

(56) References Cited

U.S. PATENT DOCUMENTS

| | | | |
|---|---|---|---|
| 1,576,269 | A | 3/1926 | Durant |
| 1,595,459 | A | 8/1926 | Durant |
| 1,671,139 | A | 5/1928 | Wilson |
| 1,873,318 | A | 8/1932 | Eason |
| 1,914,737 | A | 6/1933 | Elms |
| 1,948,628 | A | 2/1934 | Penick |
| 1,963,684 | A | 6/1934 | Shimer |
| 1,963,685 | A | 6/1934 | Shimer |
| 2,011,547 | A | 8/1935 | Campbell |
| 2,069,443 | A | 2/1937 | Hill |
| 2,103,504 | A | 12/1937 | White |
| 2,143,399 | A | 1/1939 | Abercrombie |
| 2,151,442 | A | 3/1939 | Hardy |
| 2,163,472 | A | 6/1939 | Shimer |
| 2,252,488 | A | 8/1941 | Bierend |
| 2,304,991 | A | 12/1942 | Foster |
| 2,506,128 | A | 5/1950 | Ashton |
| 2,547,831 | A | 4/1951 | Mueller |
| 2,713,522 | A | 7/1955 | Lorenz |
| 2,719,737 | A | 10/1955 | Fletcher |
| 2,745,631 | A | 5/1956 | Shellman |
| 2,756,960 | A | 7/1956 | Church |
| 2,898,082 | A | 8/1959 | Von Almen |
| 2,969,951 | A | 1/1961 | Walton |
| 2,977,874 | A | 4/1961 | Ritzerfeld et al. |
| 2,982,515 | A | 5/1961 | Clinton |
| 2,983,281 | A | 5/1961 | Bynum |
| 3,049,082 | A | 8/1962 | Barry |
| 3,053,500 | A | 9/1962 | Atkinson |
| 3,063,467 | A | 11/1962 | Roberts, Jr. |
| 3,224,817 | A | 12/1965 | Carter |
| 3,276,390 | A | 10/1966 | Bloudoff |
| 3,277,837 | A | 10/1966 | Pangburn |
| 3,288,475 | A | 11/1966 | Benoit |
| 3,459,363 | A | 8/1969 | Miller |
| 3,474,808 | A | 10/1969 | Elliott |
| 3,483,885 | A | 12/1969 | Leathers |
| 3,489,098 | A | 1/1970 | Roth |
| 3,489,170 | A | 1/1970 | Leman |
| 3,512,787 | A | 5/1970 | Kennedy |
| 3,590,387 | A | 6/1971 | Landis |
| 3,640,501 | A | 2/1972 | Walton |
| 3,809,508 | A | 5/1974 | Uchiyama |
| 3,907,307 | A | 9/1975 | Maurer |
| 3,931,755 | A | 1/1976 | Hatridge |
| 4,044,834 | A | 8/1977 | Perkins |
| 4,076,212 | A | 2/1978 | Leman |
| 4,184,814 | A | 1/1980 | Parker |
| 4,219,204 | A | 8/1980 | Pippert |
| 4,277,229 | A | 7/1981 | Pacht |
| 4,331,741 | A | 5/1982 | Wilson |
| 4,395,050 | A | 7/1983 | Wirz |
| 4,398,731 | A | 8/1983 | Gorman |
| 4,440,404 | A | 4/1984 | Roach |
| 4,508,133 | A | 4/1985 | Hamid |
| 4,518,359 | A | 5/1985 | Yao-Psong |
| 4,527,806 | A | 7/1985 | Ungchusri |
| 4,565,297 | A | 1/1986 | Korner |
| 4,662,392 | A | 5/1987 | Vadasz |
| 4,754,950 | A | 7/1988 | Tada |
| 4,763,876 | A | 8/1988 | Oda |
| 4,770,206 | A | 9/1988 | Sjoberg |
| 4,807,890 | A | 2/1989 | Gorman |
| 4,811,758 | A | 3/1989 | Piper |
| 4,861,241 | A | 8/1989 | Gamboa |
| 4,872,395 | A | 10/1989 | Bennitt et al. |
| 4,919,719 | A | 4/1990 | Abe |
| 4,951,707 | A | 8/1990 | Johnson |
| 5,020,490 | A | 6/1991 | Seko |
| 5,052,435 | A | 10/1991 | Crudup |
| 5,061,159 | A | 10/1991 | Pryor |
| 5,062,450 | A | 11/1991 | Bailey |
| 5,080,713 | A | 1/1992 | Ishibashi |
| 5,088,521 | A | 2/1992 | Johnson |
| 5,127,807 | A | 7/1992 | Eslinger |
| 5,131,666 | A | 7/1992 | Hutchens |
| 5,135,238 | A | 8/1992 | Wells |
| 5,149,107 | A | 9/1992 | Maringer |
| 5,201,491 | A | 4/1993 | Domangue |
| 5,209,495 | A | 5/1993 | Palmour |
| 5,249,600 | A | 10/1993 | Blume |
| 5,267,736 | A | 12/1993 | Pietsch |
| 5,273,570 | A | 12/1993 | Sato |
| 5,314,659 | A | 5/1994 | Hidaka |
| 5,478,048 | A | 12/1995 | Salesky |
| 5,533,245 | A | 7/1996 | Stanton |
| 5,540,570 | A | 7/1996 | Schuller |
| 5,572,920 | A | 11/1996 | Kennedy |
| 5,626,345 | A | 5/1997 | Wallace |
| 5,636,688 | A | 6/1997 | Bassinger |
| 5,674,449 | A | 10/1997 | Liang |
| 5,834,664 | A | 11/1998 | Aonuma |
| 5,859,376 | A | 1/1999 | Ishibashi |
| 5,895,517 | A | 4/1999 | Kawamura |
| 5,949,003 | A | 9/1999 | Aoki |
| 6,139,599 | A | 10/2000 | Takahashi |
| 6,200,688 | B1 | 3/2001 | Liang |
| 6,209,445 | B1 | 4/2001 | Roberts, Jr |
| 6,328,312 | B1 | 12/2001 | Schmitz |
| 6,340,377 | B1 | 1/2002 | Kawata |
| 6,382,940 | B1 | 5/2002 | Blume |
| 6,436,338 | B1 | 8/2002 | Qiao |
| 6,446,939 | B1 | 9/2002 | Hoppe |
| 6,460,620 | B1 | 10/2002 | LaFleur |
| 6,464,749 | B1 | 10/2002 | Kawase |
| 6,482,275 | B1 | 11/2002 | Qiao |
| 6,485,678 | B1 | 11/2002 | Liang |
| 6,544,012 | B1 | 4/2003 | Blume |
| 6,571,684 | B1 | 6/2003 | Nov et al. |
| 6,623,259 | B1 | 9/2003 | Blume |
| 6,634,236 | B2 | 10/2003 | Mars |
| 6,641,112 | B2 | 11/2003 | Antoff |
| 6,695,007 | B2 | 2/2004 | Vicars |
| 6,702,905 | B1 | 3/2004 | Qiao |
| 6,880,802 | B2 | 4/2005 | Hara |
| 6,910,871 | B1 | 6/2005 | Blume |
| 6,916,444 | B1 | 7/2005 | Liang |
| 6,951,165 | B2 | 10/2005 | Kuhn |
| 6,951,579 | B2 | 10/2005 | Koyama |
| 6,955,181 | B1 | 10/2005 | Blume |
| 6,959,916 | B2 | 11/2005 | Chigasaki |
| 7,000,632 | B2 | 2/2006 | McIntire |
| 7,036,824 | B2 | 5/2006 | Kunz |
| 7,144,440 | B2 | 12/2006 | Ando |
| 7,168,440 | B1 | 1/2007 | Blume |
| 7,186,097 | B1 | 3/2007 | Blume |
| 7,222,837 | B1 | 5/2007 | Blume |
| 7,290,560 | B2 | 11/2007 | Orr |
| 7,296,591 | B2 | 11/2007 | Moe |
| 7,335,002 | B2 | 2/2008 | Vicars |
| 7,341,435 | B2 | 3/2008 | Vicars |
| 7,398,955 | B2 | 7/2008 | Weingarten |
| 7,506,574 | B2 | 3/2009 | Jensen |
| 7,513,483 | B1 | 4/2009 | Blume |
| 7,513,759 | B1 | 4/2009 | Blume |
| 7,611,590 | B2 | 11/2009 | Liang |
| 7,681,589 | B2 | 3/2010 | Schwegman |
| 7,682,471 | B2 | 3/2010 | Levin |
| 7,726,026 | B1 | 6/2010 | Blume |
| 7,748,310 | B2 | 7/2010 | Kennedy |
| 7,754,142 | B2 | 7/2010 | Liang |
| 7,754,143 | B2 | 7/2010 | Qiao |
| 7,757,396 | B2 | 7/2010 | Sawada |
| 7,789,133 | B2 | 9/2010 | McGuire |
| 7,793,913 | B2 | 9/2010 | Hara |
| 7,828,053 | B2 | 11/2010 | McGuire |

(56) References Cited

U.S. PATENT DOCUMENTS

| | | |
|---|---|---|
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 | 11/2012 | Gambier |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,534,691 B2 | 9/2013 | Schaffer |
| 8,613,886 B2 | 12/2013 | Qiao |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowkski |
| 8,998,593 B2 | 4/2015 | Vicars |
| 9,010,412 B2 | 4/2015 | Mcguire |
| 9,103,448 B2 | 8/2015 | Nitkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,822,894 B2 | 11/2017 | Bayyouk et al. |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B2 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,393,113 B2 | 8/2019 | Wagner |
| 10,400,764 B2 | 9/2019 | Wagner |
| 10,415,348 B2 | 9/2019 | Zhang |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |

(56) References Cited

U.S. PATENT DOCUMENTS

| | | | |
|---|---|---|---|
| 10,670,013 | B2 | 6/2020 | Foster |
| 10,670,153 | B2 | 6/2020 | Filipow |
| 10,670,176 | B2 | 6/2020 | Byrne |
| 10,677,109 | B2 | 6/2020 | Qiao |
| 10,677,240 | B2 | 6/2020 | Graham |
| 10,677,365 | B2 | 6/2020 | Said |
| 10,711,754 | B2 | 7/2020 | Nelson |
| 10,711,778 | B2 | 7/2020 | Buckley |
| 10,718,441 | B2 | 7/2020 | Myers |
| 10,731,523 | B2 | 8/2020 | Qu |
| 10,731,643 | B2 | 8/2020 | DeLeon |
| 10,738,928 | B2 | 8/2020 | Arizpe |
| 10,753,490 | B2 | 8/2020 | Fuller |
| 10,753,495 | B2 | 8/2020 | Bayyouk |
| 10,767,520 | B1 | 9/2020 | Hattiangadi |
| 10,771,567 | B2 | 9/2020 | Sundaresan |
| 10,774,828 | B1 | 9/2020 | Smith |
| 10,781,803 | B2 | 9/2020 | Kumar |
| 10,787,725 | B2 | 9/2020 | Fujieda |
| 10,801,627 | B2 | 10/2020 | Warbey |
| 10,808,488 | B2 | 10/2020 | Witkowski |
| 10,815,988 | B2 | 10/2020 | Buckley |
| 10,830,360 | B2 | 11/2020 | Frank |
| 10,851,775 | B2 | 12/2020 | Stark |
| 10,865,325 | B2 | 12/2020 | Nakao |
| 10,907,738 | B2 | 2/2021 | Nowell |
| 10,914,171 | B2 | 2/2021 | Foster |
| 10,934,899 | B2 | 3/2021 | Hattiangadi |
| 10,941,765 | B2 | 3/2021 | Nowell |
| 10,941,866 | B2 | 3/2021 | Nowell |
| 10,954,938 | B2 | 3/2021 | Stark |
| 10,961,607 | B2 | 3/2021 | Oshima |
| 10,962,001 | B2 | 3/2021 | Nowell |
| D916,240 | S | 4/2021 | Nowell |
| 10,968,717 | B2 | 4/2021 | Tran |
| 10,988,834 | B2 | 4/2021 | Lee |
| 10,989,321 | B2 | 4/2021 | Hattiangadi |
| 10,995,738 | B2 | 5/2021 | Blume |
| 11,028,662 | B2 | 6/2021 | Rhodes |
| 11,041,570 | B1 | 6/2021 | Buckley |
| 11,078,903 | B2 | 8/2021 | Nowell |
| 11,104,981 | B2 | 8/2021 | Chen |
| 11,105,185 | B2 | 8/2021 | Spencer |
| 11,105,327 | B2 | 8/2021 | Hurst |
| 11,105,328 | B2 | 8/2021 | Bryne |
| 11,105,428 | B2 | 8/2021 | Warbey |
| 11,111,915 | B2 | 9/2021 | Bayyouk |
| 11,131,397 | B2 | 9/2021 | Yar |
| D933,104 | S | 10/2021 | Ellisor |
| D933,105 | S | 10/2021 | Ellisor |
| D933,106 | S | 10/2021 | Mullins |
| D933,107 | S | 10/2021 | Mullins |
| 11,149,514 | B2 | 10/2021 | Witkowski |
| 11,162,859 | B2 | 11/2021 | Lei |
| 11,181,101 | B2 | 11/2021 | Byrne |
| 11,181,108 | B2 | 11/2021 | Brooks |
| 11,231,111 | B2 | 1/2022 | Hurst |
| 11,242,849 | B1 | 2/2022 | Smith |
| 11,353,117 | B1 | 6/2022 | Smith |
| 11,384,756 | B1 | 7/2022 | Smith |
| 11,391,374 | B1 | 7/2022 | Ellisor |
| 11,421,679 | B1 | 8/2022 | Mullins |
| 11,421,680 | B1 | 8/2022 | Smith |
| 11,434,900 | B1 | 9/2022 | Alex |
| 11,473,686 | B2 | 10/2022 | Bayyouk |
| 11,566,713 | B2 | 1/2023 | Poremski |
| D980,876 | S | 3/2023 | Smith |
| D986,928 | S | 5/2023 | Smith et al. |
| D997,992 | S | 9/2023 | Smith et al. |
| 11,761,441 | B1 | 9/2023 | Alex et al. |
| 11,846,356 | B1 | 12/2023 | Ellisor |
| 11,920,684 | B1 | 3/2024 | Xu et al. |
| 2002/0084004 | A1 | 7/2002 | Takahashi |
| 2002/0124961 | A1 | 9/2002 | Porter |
| 2002/0159914 | A1 | 10/2002 | Yeh |
| 2003/0205864 | A1 | 11/2003 | Dietle |
| 2003/0233910 | A1 | 12/2003 | Jeong |
| 2004/0170507 | A1 | 9/2004 | Vicars |
| 2004/0194576 | A1 | 10/2004 | Ando |
| 2004/0234404 | A1 | 11/2004 | Vicars |
| 2004/0255410 | A1 | 12/2004 | Schonewille |
| 2004/0258557 | A1 | 12/2004 | Shun |
| 2005/0095156 | A1 | 5/2005 | Wolters |
| 2005/0200081 | A1 | 9/2005 | Stanton |
| 2005/0226754 | A1 | 10/2005 | Orr |
| 2006/0002806 | A1 | 1/2006 | Baxter |
| 2006/0027779 | A1 | 2/2006 | McGuire |
| 2006/0045782 | A1 | 3/2006 | Kretzinger |
| 2007/0086910 | A1 | 4/2007 | Liang |
| 2007/0154342 | A1 | 7/2007 | Tu |
| 2007/0273105 | A1 | 11/2007 | Stanton |
| 2007/0295411 | A1 | 12/2007 | Schwegman |
| 2008/0031769 | A1 | 2/2008 | Yeh |
| 2008/0052014 | A1 | 2/2008 | Toyosada |
| 2008/0092384 | A1 | 4/2008 | Schaake |
| 2008/0240949 | A1 | 10/2008 | Tackett et al. |
| 2008/0279706 | A1 | 11/2008 | Gambier |
| 2009/0041611 | A1 | 2/2009 | Sathian |
| 2009/0278069 | A1 | 11/2009 | Blanco |
| 2009/0261575 | A1 | 12/2009 | Bull |
| 2010/0230628 | A1 | 9/2010 | Stefina |
| 2010/0272597 | A1 | 12/2010 | Qiao |
| 2011/0079302 | A1 | 4/2011 | Hawes |
| 2011/0142701 | A1 | 6/2011 | Small |
| 2011/0189040 | A1 | 8/2011 | Vicars |
| 2011/0255993 | A1 | 10/2011 | Ochoa |
| 2012/0141308 | A1 | 6/2012 | Saini |
| 2012/0163969 | A1 | 6/2012 | Ongole |
| 2012/0259593 | A1 | 10/2012 | El-Zein |
| 2012/0304821 | A1 | 12/2012 | Ando |
| 2013/0020521 | A1 | 1/2013 | Byrne |
| 2013/0037739 | A1 | 2/2013 | Millard |
| 2013/0202457 | A1 | 8/2013 | Bayyouk |
| 2013/0202458 | A1 | 8/2013 | Byrne |
| 2013/0319220 | A1 | 12/2013 | Luharuka |
| 2014/0083541 | A1 | 3/2014 | Chandrasekaran |
| 2014/0083547 | A1 | 3/2014 | Hwang |
| 2014/0196883 | A1 | 7/2014 | Artherholt |
| 2014/0260954 | A1 | 9/2014 | Young |
| 2014/0286805 | A1 | 9/2014 | Dyer |
| 2014/0322034 | A1 | 10/2014 | Bayyouk |
| 2014/0322050 | A1 | 10/2014 | Marette et al. |
| 2014/0348677 | A1 | 11/2014 | Moeller |
| 2015/0127308 | A1 | 5/2015 | Thomas, Jr. et al. |
| 2015/0132157 | A1 | 5/2015 | Whaley |
| 2015/0144826 | A1 | 5/2015 | Bayyouk |
| 2015/0147194 | A1 | 5/2015 | Foote |
| 2015/0219096 | A1 | 8/2015 | Jain |
| 2015/0300332 | A1 | 10/2015 | Kotapish |
| 2015/0368775 | A1 | 12/2015 | Baker |
| 2016/0201169 | A1 | 7/2016 | Vecchio |
| 2016/0215588 | A1 | 7/2016 | Belshan |
| 2016/0238156 | A1 | 8/2016 | Hubenschmidt |
| 2016/0245280 | A1 | 8/2016 | Todorov |
| 2016/0319626 | A1 | 11/2016 | Dille |
| 2016/0319805 | A1 | 11/2016 | Dille |
| 2017/0067459 | A1 | 3/2017 | Bayyouk |
| 2017/0089334 | A1 | 3/2017 | Jahnke |
| 2017/0089470 | A1 | 3/2017 | Filipow et al. |
| 2017/0089473 | A1 | 3/2017 | Nowell |
| 2017/0097107 | A1 | 4/2017 | Hotz |
| 2017/0159655 | A1 | 6/2017 | Morreale |
| 2017/0218951 | A1 | 8/2017 | Graham |
| 2017/0218993 | A1 | 8/2017 | Freed |
| 2017/0297149 | A1 | 10/2017 | Shinohara |
| 2017/0298932 | A1 | 10/2017 | Wagner |
| 2017/0314097 | A1 | 11/2017 | Hong |
| 2017/0342776 | A1 | 11/2017 | Bullock |
| 2017/0342976 | A1 | 11/2017 | Reddy |
| 2018/0017173 | A1 | 1/2018 | Nowell |
| 2018/0058431 | A1 | 3/2018 | Blume |
| 2018/0073653 | A1 | 3/2018 | Bayyouk |
| 2018/0202434 | A1 | 7/2018 | Barnhouse, Jr |
| 2018/0298894 | A1 | 10/2018 | Wagner |

(56) References Cited

U.S. PATENT DOCUMENTS

| | | |
|---|---|---|
| 2018/0312946 A1 | 11/2018 | Gigliotti, Jr |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0360483 A1 | 11/2019 | Nowell |
| 2019/0376508 A1 | 12/2019 | Wagner |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0023245 A1 | 7/2020 | Blume |
| 2020/0208776 A1 | 7/2020 | Bayyouk |
| 2020/0217424 A1 | 7/2020 | Rasmussen |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0349472 A1 | 11/2022 | Ellisor |
| 2022/0403839 A1 | 12/2022 | Mullins |
| 2023/0407864 A1 | 12/2023 | Alex et al. |
| 2024/0117882 A1 | 4/2024 | Ellisor |

FOREIGN PATENT DOCUMENTS

| | | |
|---|---|---|
| CN | 102410194 | 4/2021 |
| EP | 0 414 955 | 3/1991 |

OTHER PUBLICATIONS

U.S. Appl. No. 17/120, 121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling, " Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/

(56) References Cited

OTHER PUBLICATIONS cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
International Search Report and Written Opinion for international application No. PCT/US2023/066143, mailed Aug. 28, 2023.

Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale NITI Compression Pillars", Scripta Materialia 59(12), 7-10, 2008.
Naghipour et al., "Fatigue Analysis of Notched Laminates: a Time-Efficient Macro-Mechanical Approach", Ohio Aerospace Institute, Cleveland, 2016.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.*, v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.,* v *Vulcan Energy Services, LLC, Vulcan Industrial Holdings, LLC, and Cizion*, LLC d/b/a/ Vulcan Industrial Manufacturing, Case No. 6:21-CV-00044-ADA, Document 4, Plaintiff's Amended Complaint for Patent Infringement and Jury Demand, Jan. 19, 2021, 30 pages.
*Kerr Machine Co.,* v *Vulcan Energy Services, LLC, Vulcan Industrial Holdings, LLC, and Cizion*, LLC d/b/a/ Vulcan Industrial Manufacturing, Case No. 6:21-CV-00044, Document 1, Plaintiff's Original Complaint for Patent Infringement and Jury Demand, Jan. 19, 2021, 47 pages.
*Kerr Machine Co.,* v *Vulcan Energy Services, LLC, Vulcan Industrial Holdings, LLC, and Cizion*, LLC d/b/a/ Vulcan Industrial Manufacturing, Case No. 6:21-CV-00044-ADA, Document 10, Plaintiff's Second Amended Complaint for Patent Infringement and Jury Demand, Feb. 1, 2021, 88 pages.
*Kerr Machine Co.,* v *Vulcan Industrial Holdings, LLC, Vulcan Energy Services, LLC, Cizion, LLC*, Case No. W-20- CV-00200-ADA-24, Order Setting Trial Date, Jun. 14, 2020, 1 page.
*Kerr Machine Co.,* v *Vulcan Industrial Holdings, LLC, Vulcan Energy Services, LLC, Cizion, LLC*, Case No. W-20- CV-00200-ADA-29, Order Setting Trial Date, Aug. 2, 2020, 1 page.
*Kerr Machine Co.,* v. *Vulcan Industrial Holdings, LLC*, Case. No. 6:20-CV-00200-ADA, Affidavit of Service, Apr. 7, 2020, 1 page.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Plaintiff's First Amended Complaint for Patent Infringement and Jury Demand, Jun. 4, 2020, 11 pages.

(56) References Cited

OTHER PUBLICATIONS

*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.,* v *Vulcan Industrial Holdings, LLC,* Case No. 6:20-CV-00200-ADA, Plaintiff's Preliminary Infringement Contentions, May 22, 2020, 50 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Defendants' Preliminary Invalidity Contentions, Aug. 13, 2020, 29 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 34, Scheduling Order, Aug. 11, 2020, 3 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 38, Plaintiff's Second Amended Complaint for Patent Infringement and Jury Demand, Sep. 25, 2020, 11 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 5, Standing Order regarding Scheduled Hearings In Civil Cases in Light of Chief Judge Garcia's 24 Amended Order, Mar. 24, 2020, 4 pages.
*Kerr Machine Co.,* v *Vulcan Industrial Holdings, LLC, Vulcan Energy Services, LLC, and Cizion,* LLC d/b/a/ Vulcan Industrial Manufacturing, Civil Docket for Case No. 6:20-cv-00200-ADA, accessed Sep. 11, 2020, 7 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 54, Claim Construction Order, Dec. 3, 2020, 3 pages.
*Kerr Machine Co.,* v *Vulcan Industrial Holdings, LLC, Vulcan Energy Services, LLC, and Cizion, LLC* d/b/a/ Vulcan Industrial Manufacturing, Case No. 6:20-CV-00200-ADA, Docket Entry, Aug. 2, 2020, 1 page.
*Kerr Machine Co.,* v *Vulcan Industrial Holdings, LLC,* Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.,* v *Kuiper Dairy, LLC, et al.,* Case No. 6:20-CV-00250-ADA-JCM, Document 20, Scheduling Order, Jul. 22, 2020, 4 pages.
*Acquanlan Deonshay Harris* v. *Cenlar, FSB,* Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B.,* v *Michael D. Ashcraft and Envirovac Waste Transport Systems, Inc.,* Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.,* Case No. 6:20-CV-00356-ADA-JCM, Document 12, Scheduling Order, Jul. 28, 2020, 4 pages.
*Tipton International, Inc.,* v. *Vetbizcorp, LLC and Samuel Cody,* Case No. 6:20-CV-00554-ADA-JCM, Document 8, Scheduling Order, Aug. 20, 2020, 4 pages.
*Dynaenergetics GmbH & Co. KG and Dynaenergetics US, Inc.,* v. *Hunting Titan, Ltd.; Hunting Titan, Inc.; and Hunting Energy Services, Inc.,* Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.,* v. *3Shape Trios A/S and 3Shape A/S,* Case No. WA:19-CV-00680-ADA, Document 27, Scheduling Order, Apr. 8, 2020, 4 pages.
*Kerr Machine Co.* vs. *Vulcan Industrial Holdings, LLC,* Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-iner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg470482q6wlVilTICh2XPA-qEAAYASAAEgKrxPD_BwE, 2013, last accessed: Aug. 21, 2020, 6 bages.
KerrPumps, "Frac One Pumps—Fluid End—Fracing," http://kerrpumps.com/fracone, 2013, last accessed: Aug. 21, 2020, 3 pages.
Kerrpumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.

(56) References Cited

OTHER PUBLICATIONS

Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.
International Search Report and Written Opinion for international application No. PCT/US2023/073458, mailed Feb. 1, 2024.

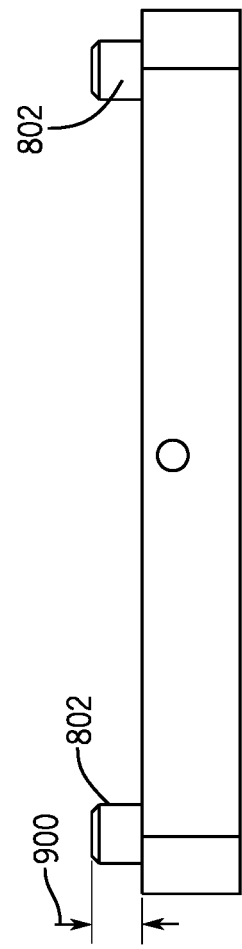
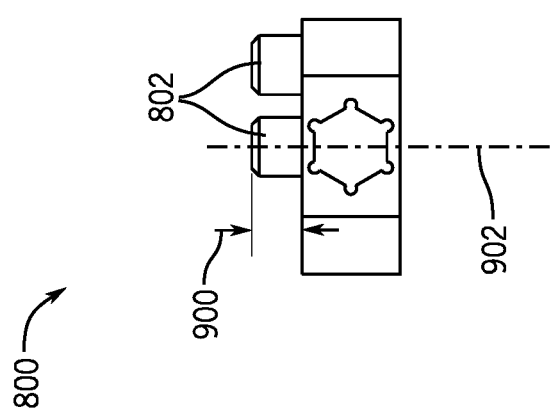
FIG. 10
FIG. 9

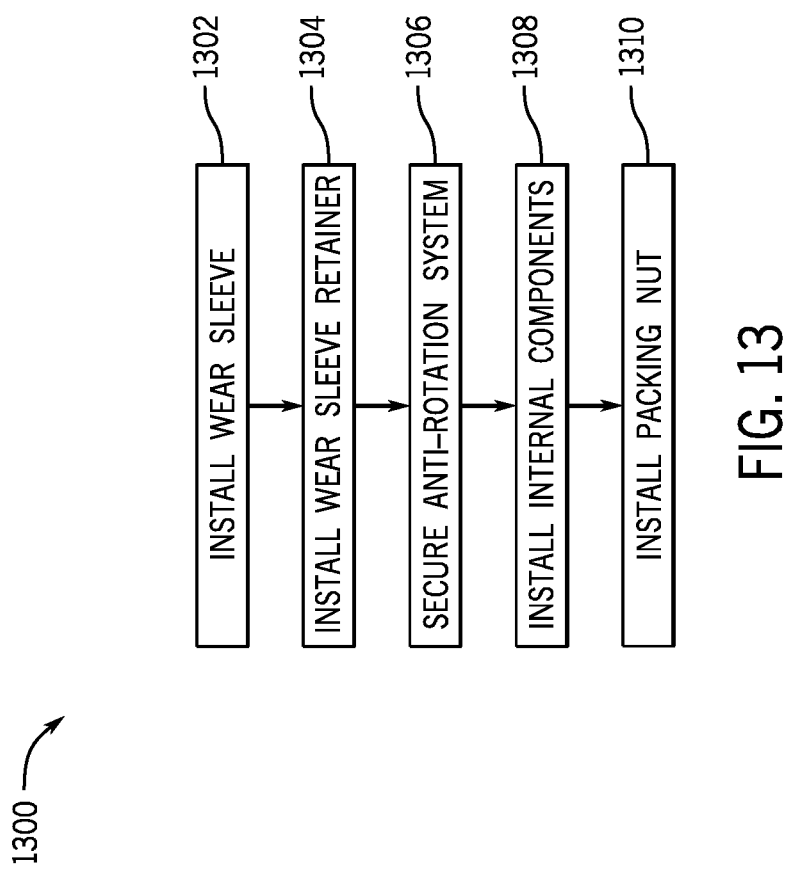

PACKING BORE WEAR SLEEVE RETAINER SYSTEM

CROSS-REFERENCE TO RELATED APPLICATIONS

This application is a continuation-in-part of U.S. patent Ser. No. 16/916,593, titled "PACKING BORE WEAR SLEEVE RETAINER SYSTEM," filed Jun. 30, 2020, now U.S. Pat. No. 11,421,680, issued Aug. 23, 2022, the full disclosure of which is hereby incorporated by reference in its entirety for all purposes.

TECHNICAL FIELD

Embodiments of the subject matter disclosed herein generally relate to pump systems, and in particular to retainer systems.

BACKGROUND

Pumping systems may be used in a variety of applications, especially industrial applications where pumping systems are used to elevate a working fluid pressure. One such application is hydraulic fracturing systems, which use high pressure pumps to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. The abrasive fluid, along with the high operating pressures, may lead to erosion within the pumping system, which may affect different components in different ways. Traditional systems have either modified materials of construction, for example by using expensive metals or coatings, or by introducing sacrificial components that are replaced over time. One such component is a wear sleeve, which is a cylindrical sacrificial component that lines a fluid end packing bore to provide a sealing surface for various sealing elements, such as plunger packing. The wear sleeve is designed to be sacrificial and a sealing surface that degrades over time, and as a result, leaks may occur. When the sealing surface degrades, the wear sleeve is removed and replaced. Typically, these wear sleeves are bolted directly onto the pump body, which uses multiple threaded fittings and may also be difficult to access.

SUMMARY

Applicant recognized the problems noted above herein and conceived and developed embodiments of systems and methods, according to the present disclosure, for retainer systems.

In an embodiment, a wear sleeve retainer system includes a wear sleeve retainer and an anti-rotation system. The wear sleeve retainer includes a body portion extending for a length, the body portion having a bore extending along an axis. The wear sleeve retainer also includes a mating component extending from the body portion and into the bore, the mating component being annular and having a smaller diameter than a bore diameter. The wear sleeve retainer further includes threads arranged circumferentially about at least a portion of an outer diameter of the body portion. The wear sleeve retainer includes a profile formed about at least a portion of the body portion, the profile including a plurality of receptacles. The anti-rotation system includes a locking fastener adapted to engage a receptacle of the plurality of receptacles.

In an embodiment, a fluid end, includes a housing having a bore extending toward a cavity, a wear sleeve positioned within the bore, a plunger positioned within a plunger bore extending through the wear sleeve, the plunger reciprocating within the plunger bore, and a wear sleeve retainer coupled to the housing and positioned to block axial movement of the wear sleeve, the wear sleeve retainer having external threads along a body that engage internal threads formed in the housing. The fluid end also includes an anti-rotation system, coupled to the housing, the anti-rotation system engaging the wear sleeve retainer to block rotation of the wear sleeve retainer in at least one direction and a packing nut coupled to the wear sleeve retainer.

In an embodiment, a method for installing a retainer system includes positioning packing seal elements within a diameter of a wear sleeve while the wear sleeve is external to a fluid end housing. The method also includes positioning the wear sleeve within a bore formed in the fluid end housing. The method further includes securing a wear sleeve retainer to the fluid end housing by threading the wear sleeve retainer into the fluid end housing, wherein external threads on a body of the wear sleeve retainer engage internal threads in the bore, the wear sleeve retainer engaging at least a portion of the wear sleeve. The method includes securing an anti-rotation system to the wear sleeve retainer.

BRIEF DESCRIPTION OF THE DRAWINGS

The present technology will be better understood on reading the following detailed description of non-limiting embodiments thereof, and on examining the accompanying drawings, in which:

FIG. 9 is a front view of an embodiment of a lock body, in accordance with embodiments of the present disclosure;

FIG. 10 is a side view of an embodiment of a lock body, in accordance with embodiments of the present disclosure;

FIG. 13 is a flow chart of an embodiment of a method for a retainer system, in accordance with embodiments of the present disclosure;

DETAILED DESCRIPTION

Figure 1:
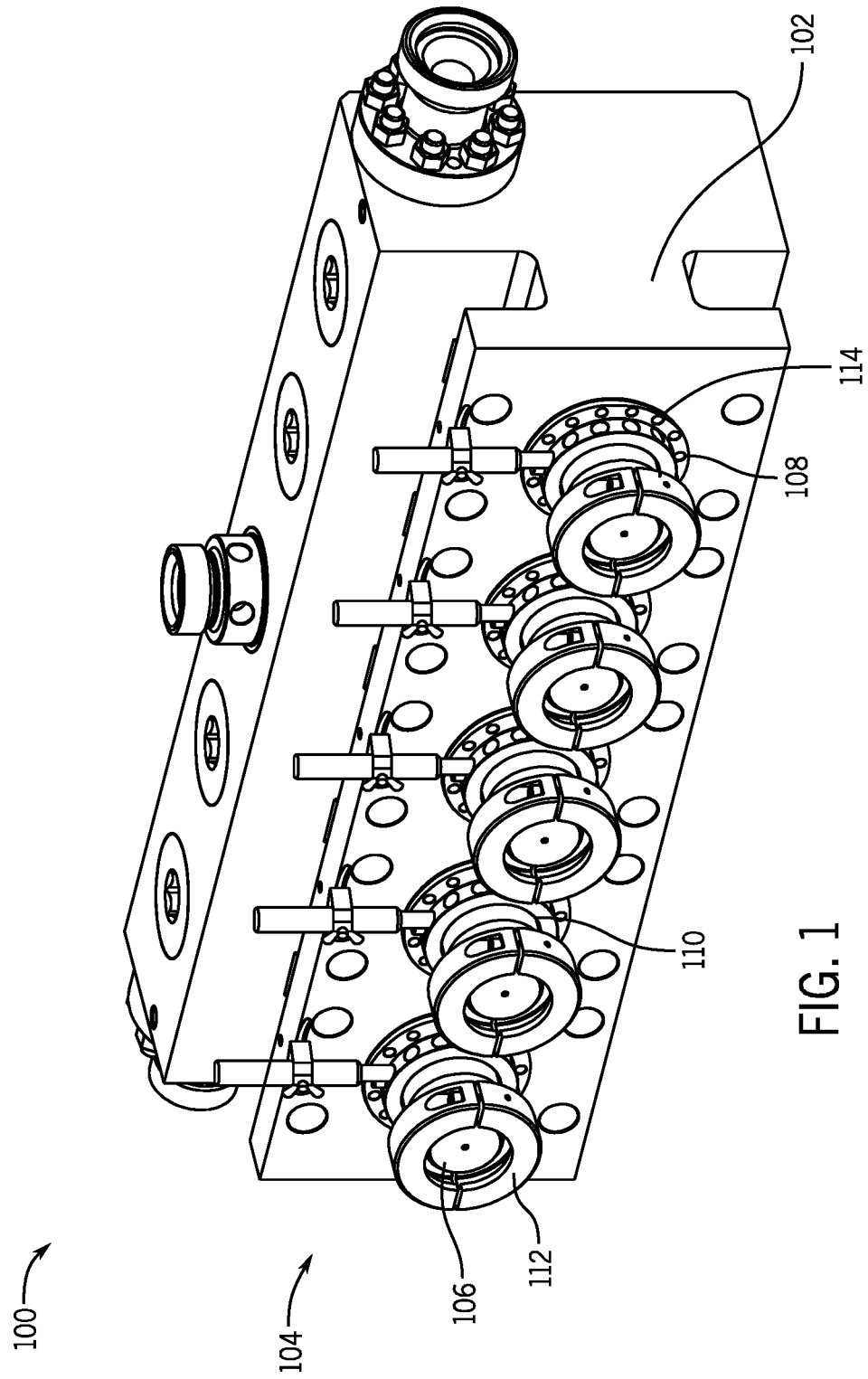
FIG. 1 is a perspective view of an embodiment of a fluid end, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a packing bore wear sleeve retainer system with an integrated anti-rotation device for use on positive displacement reciprocating pumps. Such pumps include hydraulic fracturing pumps, mud pumps, and similar plunger or piston pumps. Embodiments incorporate a wear sleeve retainer that has an outer diameter that is threaded and an internal diameter that is threaded at an end for receiving the mating component packing nut. On the opposite end, the wear sleeve retainer is configured geometrically to capture and secure the wear sleeve when it is fully threaded into the packing bore of the fluid end. The sleeve retainer is designed to secure the wear sleeve into the gland of the fluid end bore tightly and incorporates sealing elements to prevent high-pressure fluid leakage from the pumping chamber along with preventing leakage of high-pressure grease or oil, which is used to lubricate the plunger.

Embodiments of the present disclosure include features that allow the wear sleeve retainer to be removed and reassembled into the fluid end quickly by the operator and with ease by the use of a separate spanner wrench attachment tool that can be used in conjunction with industry standard ratchet style wrenches. Furthermore, embodiments include an integrated anti-rotation device. When the wear sleeve retainer is fully threaded into the packing bore of the fluid end, the device set screw bolt is tightened down and secures into one of multiple slots that are positioned at multiple points 360 degrees around the outer diameter, preventing the wear sleeve retainer from unthreading from the fluid end while in operation due to vibrations.

The wear sleeve is presented in various embodiments as a cylindrical sacrificial component that lines the fluid end packing bore to provide a sealing surface for the sealing elements (e.g., plunger packing), the wear sleeve is intended to be sacrificial, during pumping operations the packing will seal up on the plunger which is reciprocating in and out of the fluid end and the inner diameter of the wear sleeve. The sealing surface of the wear sleeve will begin to degrade with time due to high-pressure abrasive fluids eroding the material until it can no longer seal satisfactorily, and high-pressure fluid leakage will then occur causing washout metal erosion damage. At this point, maintenance occurs on the fluid end and the wear sleeve is removed from the fluid end and replaced with a new one. Embodiments of the present disclosure are directed toward a reliable, easy, and fast retention system to enable on-site maintenance by field service personnel. Prior art wear sleeve retainer systems incorporate a bolt on flange. The design is less reliable and slow to work on due to the many bolts that all required to be torqued down to specification. There is limited access space to maneuver tools to torque down the many bolts when the fluid end is attached to the pump, which is often the case when performing maintenance on the fluid end while the unit is on the job site. Another issue with prior art sleeve retainer designs is that they can at times begin to loosen or back out, causing the wear sleeve to be able to move back and forth in the gland, causing leakage or severe mechanical damage to the pump. Embodiments of the present disclosure overcome these problems by incorporating an integrated anti-rotation mechanical device that is fast and easy to use and prevents the wear sleeve retainer from backing out while pumping.

Embodiments of the present disclosure provide significant advantages over prior art systems and utilize a sleeve retainer system that threads into the fluid end via the use of a spanner wrench attachment and has an integrated anti-rotation lock mechanism to keep the sleeve retainer from backing out during pumping operations, thereby solving problems associated with back out during pumping, which may result in high pressure fluid leakage (washout erosion damage) or severe mechanical damage to pumping equipment. Embodiments of the present disclosure also eliminate the use of prior art bolts, which are torqued down to specification, this is difficult due to limited access behind the fluid end when being mounted to the power frame.

Embodiments of the present disclosure further incorporate one or more anti-rotation devices that may interact with a wear sleeve retainer positioned to maintain a position of a wear sleeve within a bore. A fastener may extend through at least a portion of a fluid end housing to engage a region of the wear sleeve retainer that is arranged within the bore. In at least one embodiment, a wedge-lock retainer profile may be incorporated into the system. In various embodiments, one or more steps or ridges of the wear sleeve retainer may include an aperture or orifice to receive the fastener. However, in other embodiments, the fastener may not interact with an aperture or orifice, which may increase useability of the system due to working in a variety of different alignments. The fastener may extend toward the wear sleeve retainer and be positioned proximate a ridge or step such that rotation of the ridge or step toward the fastener leads to the ridge or step engaging the fastener and thereby blocking rotation. The fastener may be arranged within a counter-bored hole and extend through one or more of a top of the housing, a bottom of the housing, or a side of the housing. Additionally, the fastener may be positioned with a vertical orientation (e.g., axis of the fastener perpendicular to an axis of the bore) or at an orientation where the axis of the fastener is not perpendicular to the axis of the bore.

In at least one embodiment, systems and methods may incorporate a front-mounted system that engages the wear sleeve retainer to block rotation of the wear sleeve retainer. By way of example, a pad retainer may be incorporated into the system that is positioned to bear against a surface of the wear sleeve retainer, which may be textured or knurled surface to provide further resistance to rotation when incorporated with the pad retainer. The pad retainer may be fastened or otherwise secured to the housing and positioned to engage the textured surface of the wear sleeve retainer to apply a force against the wear sleeve retainer. In operation, as the wear sleeve retainer begins to rotate and/or receives a force to drive rotation, the pad retainer may cause a frictional force on the surface to resists or overcomes the rotational force, thereby blocking rotation of the wear sleeve retainer.

FIG. 1 is a perspective view of an embodiment of a fluid end 100. As noted above, fluid ends 100 may be utilized in industrial applications, such as oil and gas applications, to deliver high-pressure fluids to piping components leading to wellbores. For example, hydraulic fracturing operations use fluid ends 100 to increase a fluid pressure for fracturing fluid, which may be corrosive and/or abrasive, prior to injection into a wellbore. Fluid ends 100 are often coupled to engines, which provide motive power to drive reciprocation of various plungers. The engines may provide sufficient power to pressure fluid to pressure ranges from 5,000-25,000 pounds per square inch (psi). It should be noted that these pressure ranges are provided by example and are not intended to limit the scope of the present disclosure, as the pressures ranges may be less than 5,000 psi or greater than 25,000 psi in various applications. Furthermore, as noted, while discussion may be directed toward hydraulic fracturing operations systems and methods may be used in a variety of other industries that incorporate pumping systems.

The illustrated fluid end 100 includes a manifold body or housing 102 that is illustrated as a single, unitary piece, but it should be appreciated that the housing 102 may be formed of multiple sections. As will be appreciated, the housing 102 may include a conduit or bore that is represented as an inlet that received a low pressure fluid, a chamber that receives the low pressure fluid, and an outlet that intersects the chamber and discharges the high pressure fluid.

In this embodiment, the fluid end 100 includes five different plunger assemblies 104, each including a plunger 106, a wear sleeve retainer 108, a packing nut 110, and a flange 112. As shown, the wear sleeve retainer 108 is coupled directly to the housing 102 via fasteners 114, which are bolts in the illustrated embodiment. Because space is at a premium at a well site, it may be difficult to access the fasteners 114 when the wear sleeve (not pictured) is replaced. This may be difficult or time consuming for operators, which may lead to increased downtime at the site. Embodiments of the present disclosure include an improved system for retaining the wear sleeve as well as components for installation and removal.

Figure 2:
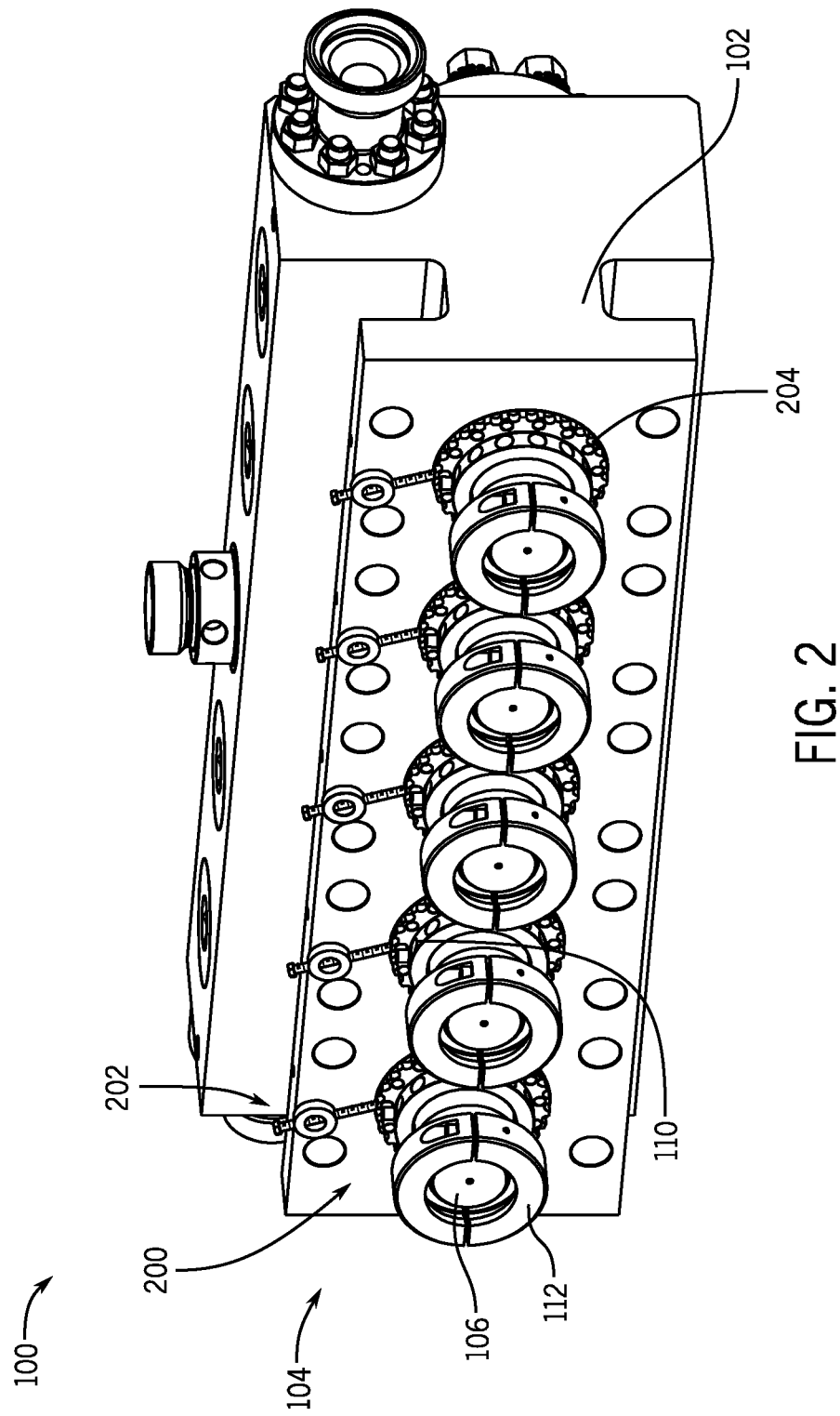
FIG. 2 is a perspective view of an embodiment of a fluid end, in accordance with embodiments of the present disclosure.

FIG. 2 is a perspective view of an embodiment of the fluid end 100 including the plunger assemblies 104 having a wear sleeve retainer system 200. As will be described in detail below, the system 200 does not include the fasteners 114, but rather, uses internal threads to couple components to the housing 102. Such an arrangement enables faster assembly and disassembly, thereby reducing time for maintenance. Furthermore, embodiments may include an anti-rotation system 202 that reduces the likelihood of backing out of a wear sleeve retainer 204 that forms part of the system 200. Accordingly, the wear sleeve (not pictured) is still replaceable and may be utilized as a sacrificial component, however, installation is simplified and faster.

Figure 3:
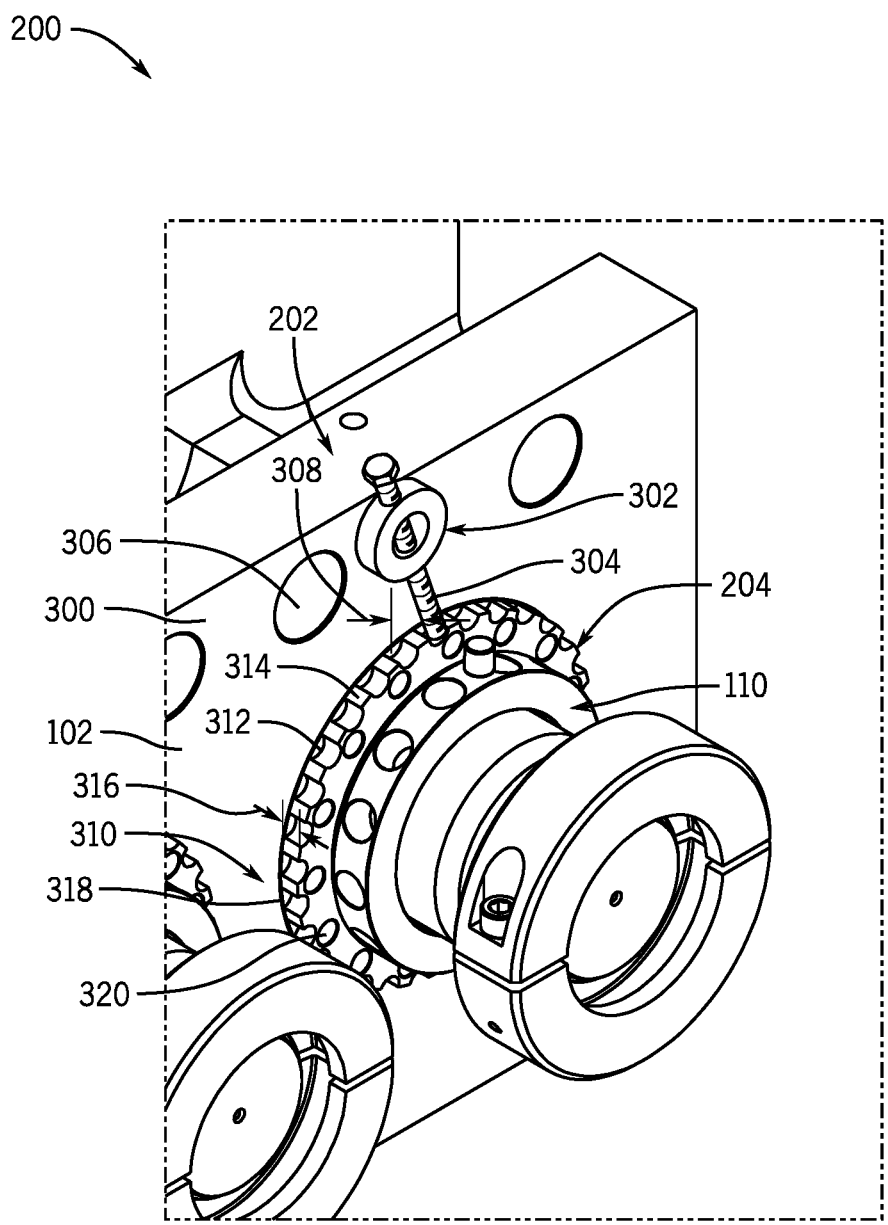
FIG. 3 is a perspective view of an embodiment of a retainer system, in accordance with embodiments of the present disclosure.

FIG. 3 is a perspective view of an embodiment of the system 200 coupled to the housing 102. In the illustrated embodiment, the wear sleeve retainer 204 is positioned against the housing 102, for example, against a housing external face 300 (e.g., face). It should be appreciated that in other embodiments there may be a recessed portion in the housing face 300, or a platform, to receive the wear sleeve retainer 204. In other words, the housing external face 300 may not be planar in all embodiments. As will be described below, the wear sleeve retainer 204 may engage internal threads formed along a bore extending through the housing 102 that receives the plunger 106. As a result, external fasteners for securing the wear sleeve retainer 204 to the housing 102 may be eliminated. That is, the fasteners 114 of FIG. 1 that provide a direct coupling that ends through the wear sleeve retainer 204 are reduced and/or eliminated by incorporating embodiments of the present disclosure.

The illustrated wear sleeve retainer 204 is secured against rotation by the anti-rotation system 202, which includes a locking mechanism 302 and a locking fastener 304. The locking mechanism 302 is secured to an aperture 306 formed in the housing 102. In various embodiments, the locking mechanism 302 is threaded into the aperture 306, press fit into the aperture 306, fastened to the aperture 306, or the like. For example, in an embodiment, a threaded fitting may be utilized to secure the locking mechanism 302 to the housing 102 via the aperture 306. In various embodiments, the aperture 306 is positioned in a particularly selected location to facilitate incorporation with the anti-rotation system and the wear sleeve retainer 204, as will be described below. However, in various other embodiments, the locking mechanism 302 may be adjustable to enable a modification of an anti-rotation angle of 308 of the locking fastener 304. As will be appreciated, even if threaded fasteners are utilized for the locking mechanism 302, a total of five threaded fasteners would be used for the illustrated embodiment (e.g., one for each of the five plunger assemblies 104), compared to potentially a dozen for each plunger assembly in prior configurations. The locking mechanism 302 receives the locking fastener 304, which is illustrated as a threaded bolt, which extends toward and engages the wear sleeve retainer 204. As shown, the locking fastener 304 is arranged at the anti-rotation angle 308 that is biased against a removal rotation for the wear sleeve retainer 204 (e.g., counter clockwise). By positioning the locking fastener 304 at the angle 308, forces may be distributed along two force component directions (e.g., vertically and horizontally), thereby enabling smaller locking fasteners 304. In this example, rotation in the counter clockwise direction is blocked due to engagement between the wear sleeve retainer 204 and the locking fastener 304. Accordingly, problems with traditional systems associated with backing out of wear sleeve retainers secured directly to the housing 102 by fasteners are overcome because each of the fasteners, such as the fasteners 114 of FIG. 1, are subjected to forces along a single plane. Moreover, as will be described, the locking fastener 304 may be marked or otherwise used as an indicator during installation and/or maintenance procedures.

The illustrated wear sleeve retainer 204 includes an outer circumference profile 310 having a plurality of spaced apart valleys 312 separated by flats 314. The valleys 312 are illustrated having a semi-circular shape with a radius, however, it should be appreciated that the valleys 312 may be any reasonable shape. For example, the valleys 312 may include sloped sides extending to trench or may include a single sloped side, among various other configurations. Moreover, the flats 314 may also be a different shape and are referred to as "flats" for illustrative purposes, but may include rounded edges or the like. In certain embodiments, the valleys 312 may also include a mating aperture for receiving the locking fastener 304. Each of the valleys 312 extend for a longitudinal valley depth 316 toward the housing external face 300. That is, the valleys 312 in the illustrated embodiment include a backstop 318, which may be a portion of a threaded body portion that is installed within a bore formed in the housing 102. The backstop 318 may provide a visual indication to the operator regarding installation of the wear sleeve retainer 204. For example, the backstop 318 may be substantially flush with the housing external face 300 to indicate full installation. However, it should be appreciated that the backstop 318 may also be recessed relative to the housing external face 300 to provide room for the locking fastener 304.

Further illustrated with respect to the wear sleeve retainer 204 are a plurality of blinds 320 positioned circumferentially about the wear sleeve retainer 204. The illustrated blinds 320 are radially inward, with respect to the valleys 312, and are positioned to align with the flats 314 in the illustrated embodiment. Such an arrangement is for illustrative purposes, and the blinds 320 may be particularly positioned based on a number of different factors. As will be described below, the blinds 320 may be utilized to receive a tool for installation of the wear sleeve retainer 204. For example, an extrusion or extension of a tool may be fitted to engage one or more blinds 320 to enable rotation of the wear sleeve retainer 204, thereby securing the wear sleeve retainer 204 to the housing 102.

FIG. 3 also includes the packing nut 110 positioned outward of the wear sleeve retainer 204 and also the plunger 106 extending through aligned bores extending through the wear sleeve retainer 204 and the packing nut 110. Accordingly, a familiar arrangement is maintained, which may simplify installation procedures for operators. Moreover, the illustrated configuration may enable other equipment to be utilized in the course of traditional operations, such as packing nut locks bars and the like.

Figure 4:
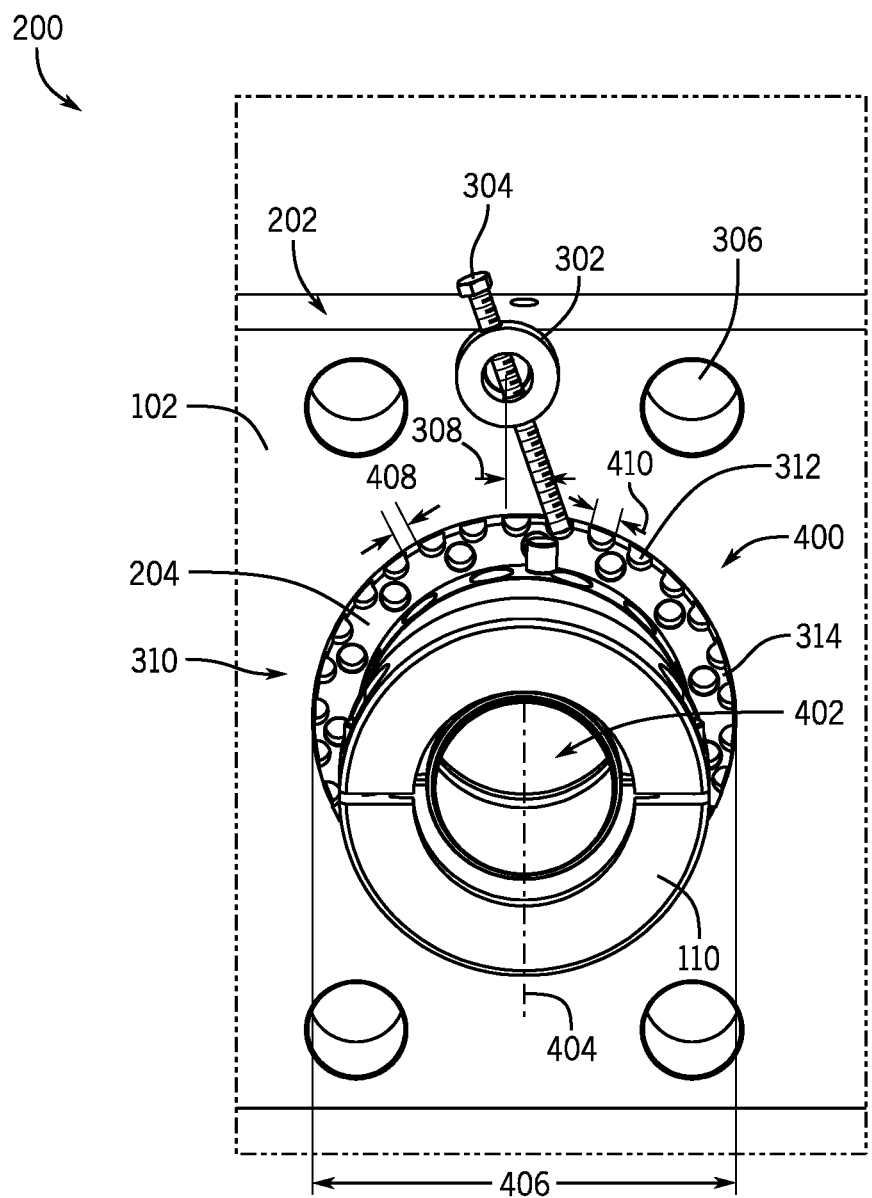
FIG. 4 is a perspective view of an embodiment of a retainer system, in accordance with embodiments of the present disclosure.

FIG. 4 is a front perspective view of an embodiment of the retainer system 200 in which the plunger 106 has been removed for clarity. As described above, in various embodiments the wear sleeve retainer 204 is installed within a bore 400 formed in the housing 102. The bore may also include a wear sleeve, packing, and the like, as will be described in detail below. In this embodiment, the wear sleeve retainer 204 is installed along the bore 400 via external threads formed on the wear sleeve retainer 204 and internal threads of the bore 400. Furthermore, in this embodiment, a plunger bore 402 is shown extending through both the wear sleeve retainer 204 and the packing nut 110. In operation, the plunger 106 is installed through the plunger bore 402 and reciprocates back and forth, along a plunger bore axis 404 in order to pressurize fluid within the housing 102.

As described above, the circumferential profile 310 is illustrated extending entirely around the wear sleeve retainer 204, thereby enabling installation of the wear sleeve retainer 204 in any orientation that facilitates alignment with the threads. In this embodiment, each of the valleys 312 is equally spaced about an outer diameter 406 of the wear sleeve retainer 204. However, it should be appreciated that different patterns or positions for the valleys 312 may be provided in various embodiments, Moreover, spacing between valleys 312 may be different. That is, a flat length 408 may vary at different regions. Furthermore, a valley length 410 may also vary between different valleys 312. Accordingly, various profile 310 configurations may be particularly selected for different operational goals, such as reducing weight, driving alignment of components, and the like.

As noted above, the anti-rotation system 202 includes the locking mechanism 302 installed within the aperture 306 with the locking fastener 304 extending through the locking mechanism 302 at the angle 308. This angle 308 may be particularly selected to transmit a rotational force in a counter clockwise direction, which would correspond to a direction that would unthread or back out the wear sleeve retainer 204. The illustrated angle 308 is approximately 30 degrees. However, it should be appreciated that the angle 308 may be any reasonable angle to prevent rotation of the wear sleeve retainer 204, such as approximately 15 degrees, approximately 35 degrees, approximately 45 degrees, approximately 50 degrees, or the like. Furthermore, it should be appreciated that the relative location of the anti-rotation system 200 is for illustrative purposes only and may be below the wear sleeve retainer 204, next to the wear sleeve retainer 204, or at any other reasonable location to engage at least a portion of the wear sleeve retainer 204 and to block rotation of the wear sleeve retainer 204.

Figure 5:
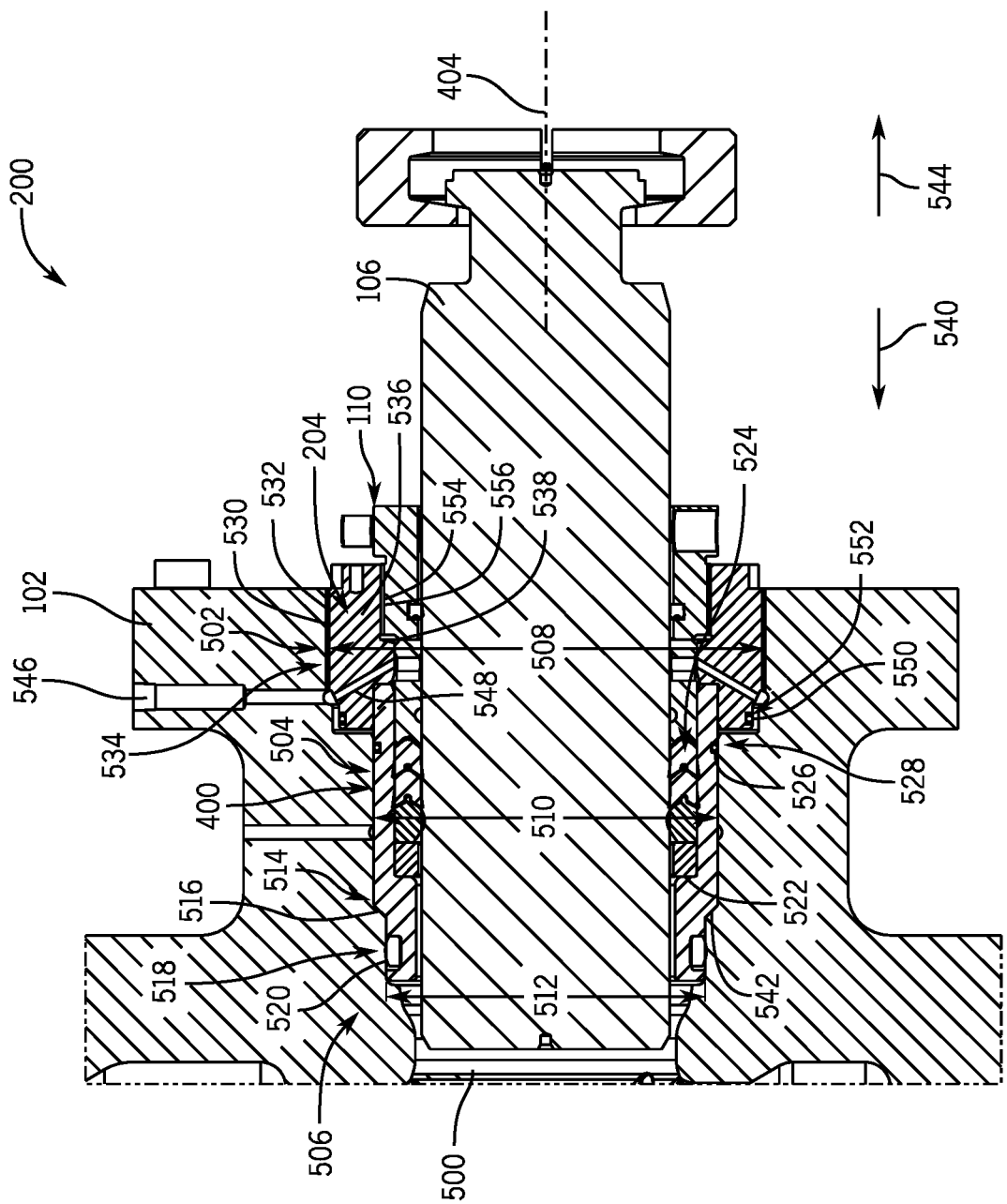
FIG. 5 is a cross-sectional view of an embodiment of a retainer system for a plunger assembly, in accordance with embodiments of the present disclosure.

FIG. 5 is a cross-sectional view of an embodiment of the retainer system 200 coupled to the housing 102. It should be appreciated that various features have been eliminated for simplicity with the following discussion. The illustrated embodiment includes the bore 400 extending through the housing 102 toward a cavity 500. The bore 400 includes a first bore section 502, a second bore section 504, and a third bore section 506, each having a different respective bore diameter. For example, a first bore section diameter 508 is larger than a second bore section diameter 510, which is larger than a third bore section diameter 512. It should be appreciated that this arrangement is for illustrative purposes and in various embodiments there may be more sections and/or different diameters.

The illustrated plunger assembly 104 includes a wear sleeve 514 arranged within the bore 400 and extending through each of the first, second, and third bore sections 502, 504, 506. The wear sleeve 514 is a stepped sleeve having a transition 516 where the diameter changes. The illustrated wear sleeve 514 is positioned to bear against a wear sleeve seal 518 positioned within a wear seal groove 520 formed in the wear sleeve 514. It should be appreciated that the seal 518 and groove 520 may also be formed in the housing 102 in other embodiments. The wear sleeve 514 also includes a shelf 522 that enables packing 524 to be installed along an inner portion of the wear sleeve 514, which may bear against the plunger 106 extending through the bore 400. The wear sleeve 514 also includes an external seal 526 in an external seal groove 528 for engaging the wear sleeve retainer 514. It should be appreciated that the external seal 526 and groove 528 may also be arranged within the wear sleeve retainer 204.

In operation, the wear sleeve 514 is installed within the bore 400 and the wear sleeve retainer 204 is utilized to secure the wear sleeve 514 at a desired position. In this embodiment, the housing 104 includes threads 530, which may engage mating threads 532 on the wear sleeve retainer 204. The illustrated threads 530 are formed along the bore 400 at the first bore section 502. In other words, the threads 530 in the illustrated embodiment may be described as being internal to the housing 102. These threads 530 engage the mating threads 532 formed along a body outer circumference 534 of a body 536 of the wear sleeve retainer 204. As will be appreciated, the body 536 may extend axially into the first bore section 502 a predetermined amount to facilitate engagement of the wear sleeve 514. In this example, a mating component 538 extends radially inward, toward the axis 404, to engage the wear sleeve 514. As a result, axial movement of the wear sleeve 514 is blocked along the axis 404. That is, axial movement in a first direction 540 toward the chamber 500 is blocked by a transition 542 along the bore 400 and axial movement in a second direction 544 toward the wear sleeve retainer 204 is blocked via the mating component 538 and an opposing force provided by the threads 530 and the mating threads 532. Accordingly, the wear sleeve 514 is secured in position within the bore 400.

In various embodiments, ports 546 are formed within the housing 102 and align with mating ports 548 formed in the wear sleeve retainer 204. As a result, grease or other lubricants may be added to various components, such as the plunger 106, without removing the packing assemblies 524. Moreover, various seals may also be utilized to block fluid leakage, such as the external seal 526 and/or a wear sleeve seal 550 positioned in a wear sleeve seal groove 552 formed in the body 536, which as noted above may also be formed in the housing 102.

Installation may also include the packing nut 110, which secures the packing 524 within the wear sleeve 514. The packing nut 110 may couple to the wear sleeve retainer 204, for example via threads 554 and mating threads 556 formed on the packing nut and the wear sleeve retainer 204, respectively. However, it should be appreciated that other coupling devices, such as clamps or fasteners, may also be utilized. Accordingly, embodiments of the present disclosure provide the retainer system 200 for maintaining a position of the wear sleeve 514 within the bore 400 without using external threads to directly couple the wear sleeve retainer 204 to the housing 102.

Figure 6:
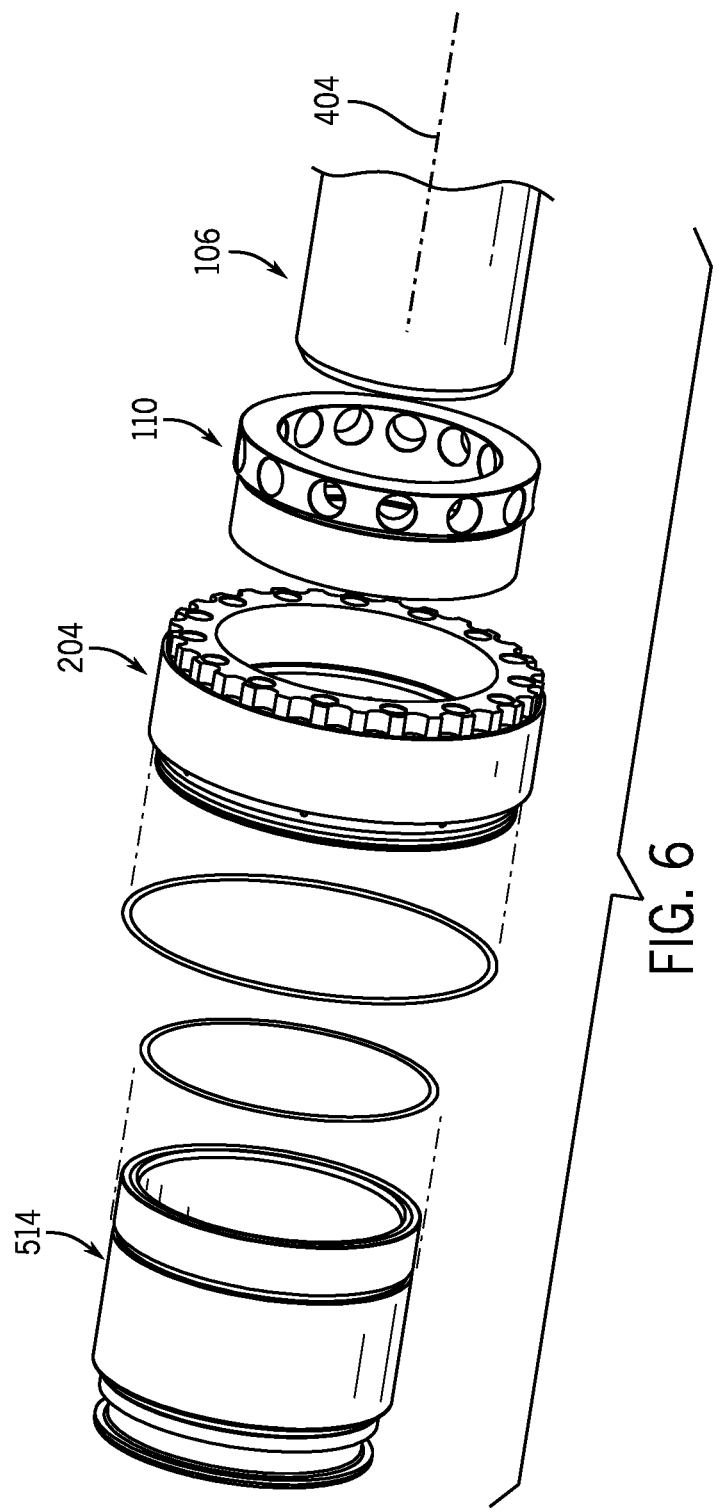
FIG. 6 is an exploded view of an embodiment of a retainer system, in accordance with embodiments of the present disclosure.

FIG. 6 is a partial exploded view of an embodiment of components of the retainer system 200 for securing the wear sleeve 514 within the bore 400. As noted above, features have been eliminated for clarity and conciseness. The illustrated embodiment shows each of the wear sleeve 514, wear sleeve retainer 204, packing nut 110, and plunger 106 being aligned along the axis 404, thereby enabling coaxial alignment within the bore 400.

Figure 7:
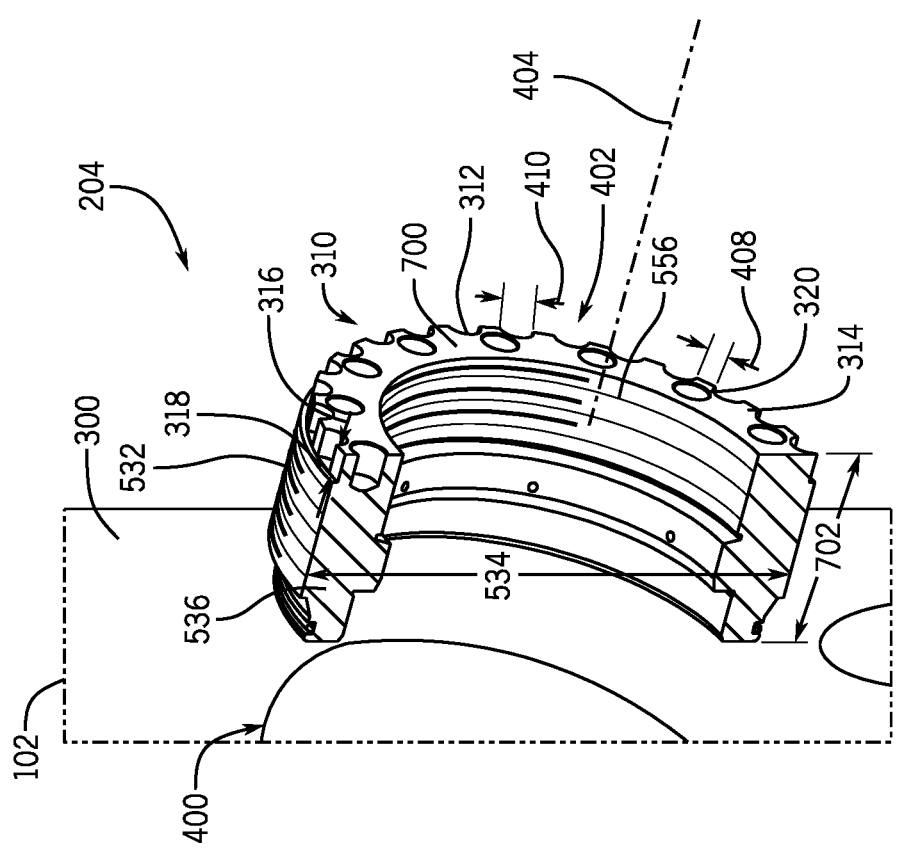
FIG. 7 is a perspective view of an embodiment of a wear sleeve retainer, in accordance with embodiments of the present disclosure.

FIG. 7 is cross-sectional perspective view of the wear sleeve retainer 204. As noted above, the illustrated wear sleeve retainer 204 is a generally cylindrical component that includes a body 536 extending axially from a face end 700 that is substantially aligned with the external housing face 300 when installed within the housing 102. The face end includes the blinds 320 arranged circumferentially about the face end 700, as well as the profile 310 along the circumference. As noted above, the profile includes the valleys 312 and flats 314, where the flats 314 extend for the length 408 and the valleys 312 extend for the length 410, each of which may be adjusted as particularly selected for various applications. In various embodiments, the valleys 312 extend for the valley depth 316 that does not extend through an entire length 702 of the wear sleeve retainer 204, but rather, to a backstop 318. The backstop 318 abuts the threads 532 formed along the outer body diameter 534, which may facilitate engagement with the threads 530 formed in the housing 102.

The plunger bore 402 of the wear sleeve retainer 204 also includes the threads 556 for coupling to the packing nut 110. Also provided within the plunger bore 402 is the mating component 538, which is illustrated as extending annularly around the plunger bore 402. The mating component 538 engages the wear sleeve 514, thereby blocking movement of the wear sleeve 514 out of the bore 400 toward the face end 700.

Figure 8:
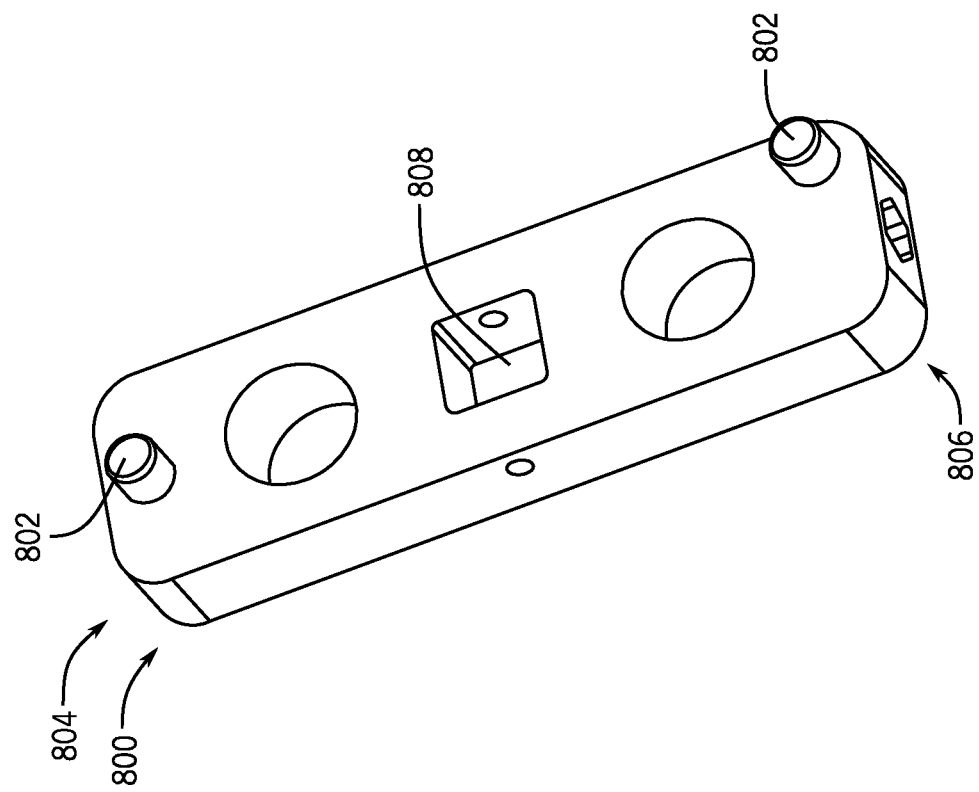
FIG. 8 is a perspective view of an embodiment of a lock body, in accordance with embodiments of the present disclosure.

FIG. 8 is a perspective view of an embodiment of a lock body 800 that may be utilized to install the wear sleeve retainer 204. The illustrated lock body 800 includes a pair of extensions 802 at opposite ends 804, 806 of the lock body 800. The illustrated extensions 802 are substantially circular and may be shaped to interact with the blinds 320 formed in the wear sleeve retainer 204. Accordingly, the lock body 800 may be aligned with the wear sleeve retainer 204 such that the extensions 802 interact with the blinds 320 to facilitate installation of the wear sleeve retainer 204, for example, by using a tool to rotate the wear sleeve retainer 204. The illustrated extensions 802 are positioned in a non-symmetrical arrangement in FIG. 8, however, it should be appreciated that the respective locations of the extensions 800 may be particularly selected based on the blind configuration of the wear sleeve retainer 204.

In various embodiments, the lock body 800 is configured to be adaptable to utilize existing tools, such as a ratchet wrench. Accordingly, the lock body 800 includes a coupling aperture 808 for receiving a mating tool part. In this manner, existing tools already present at the well site may be utilized with the lock body 800 to facilitate operations, thereby reducing clutter and leveraging existing components.

FIG. 9 is a front elevational view of the lock body 800. In the illustrated embodiment, the extensions 802 have a length 900, which may be particularly selected based on the size of the associated blinds 320. In various embodiments, the extensions 802 may have different sizes, thereby providing a guide or indication regarding proper alignment or coupling to the wear sleeve retainer 204. In this example, the non-symmetrical arrangement of the extensions 802 is further illustrated, in that the extensions 802 are not symmetrical about centerline 902. This configuration may facilitate coupling at different circumferential positions of the wear sleeve retainer 204, which may enable reduced force applications for installation and removal.

FIG. 10 is a side elevational view of the lock body 800. As noted above, each of the extensions 802 extend for the same length 900, but, in various embodiments the lengths 900, along with the shapes of the extensions 802, may be different. It should be appreciated that various other dimensions of the lock body 800, such as the width, thickness, length, etc. may be particularly selected based on operating conditions.

Figure 11A:
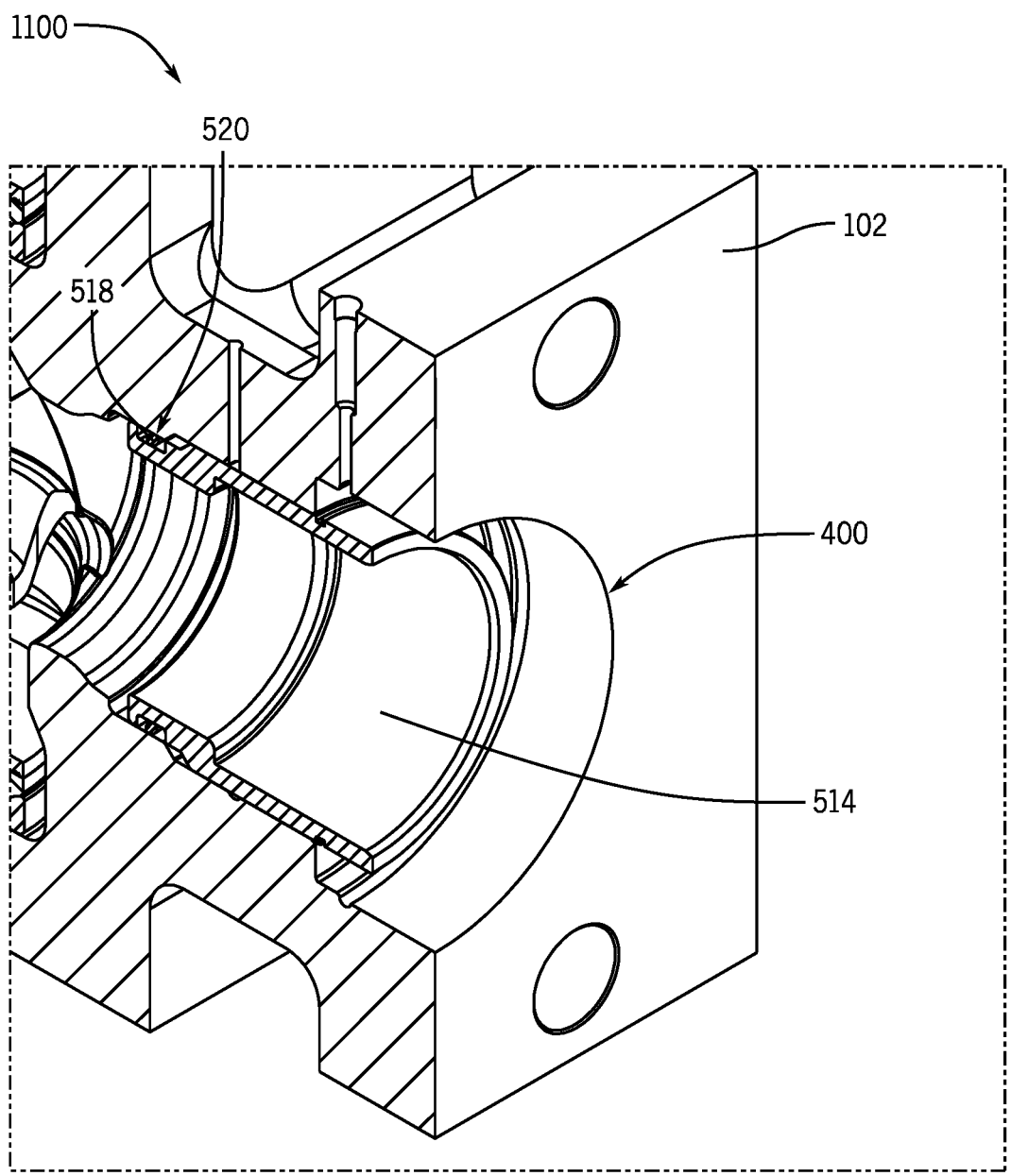
FIGS. 11A-11E are perspective views of embodiments of an installation procedure, in accordance with embodiments of the present disclosure.
Figure 11B:
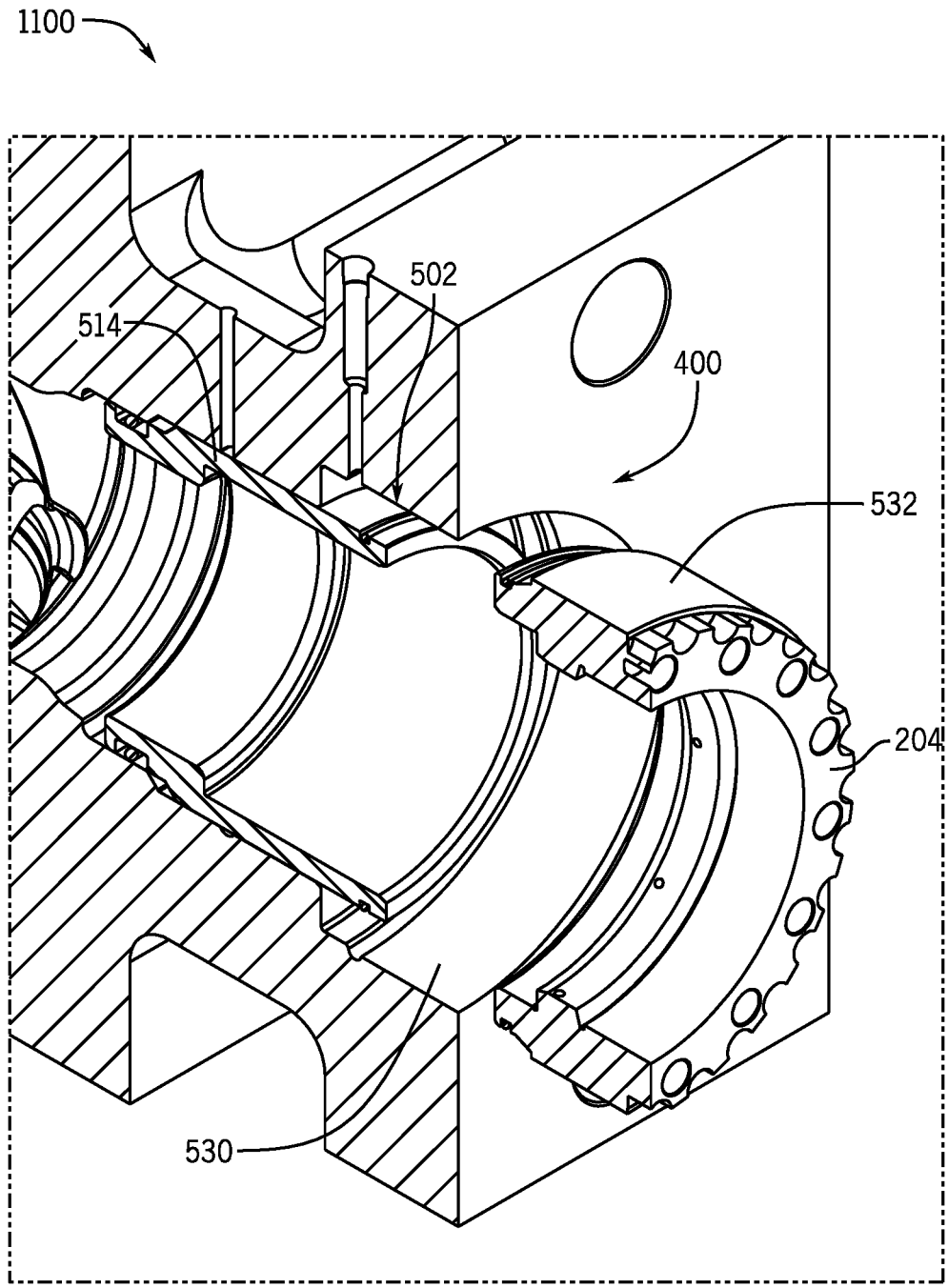

FIGS. 11A-11E illustrate perspective views of an installation procedure 1100 for securing the wear sleeve 514 within the bore 400 using the retainer system 200. As noted above, various components and have been removed for simplicity with the following explanation, for example steps involving applying coatings, grease, lubrication, installing seals, and the like. Additionally, features such as threads and the like have been removed for clarity, however, threaded components have been described elsewhere herein. Furthermore, the steps may be performed in a different order, unless otherwise indicated. FIG. 11A illustrates the wear sleeve 514 installed within the bore 400 such that the bore 400 engages the seal 518 positioned within the seal groove 520. In various embodiments, the wear sleeve 514 is inserted into the bore 400. FIG. 11B illustrates the procedure 1100 of wear sleeve retainer 204 aligned with the bore 400. As noted above, the wear sleeve retainer 204 may be installed within the bore 400 such that the mating threads 532 engage the threads 530 formed along the first bore section 502.

Figure 11C:
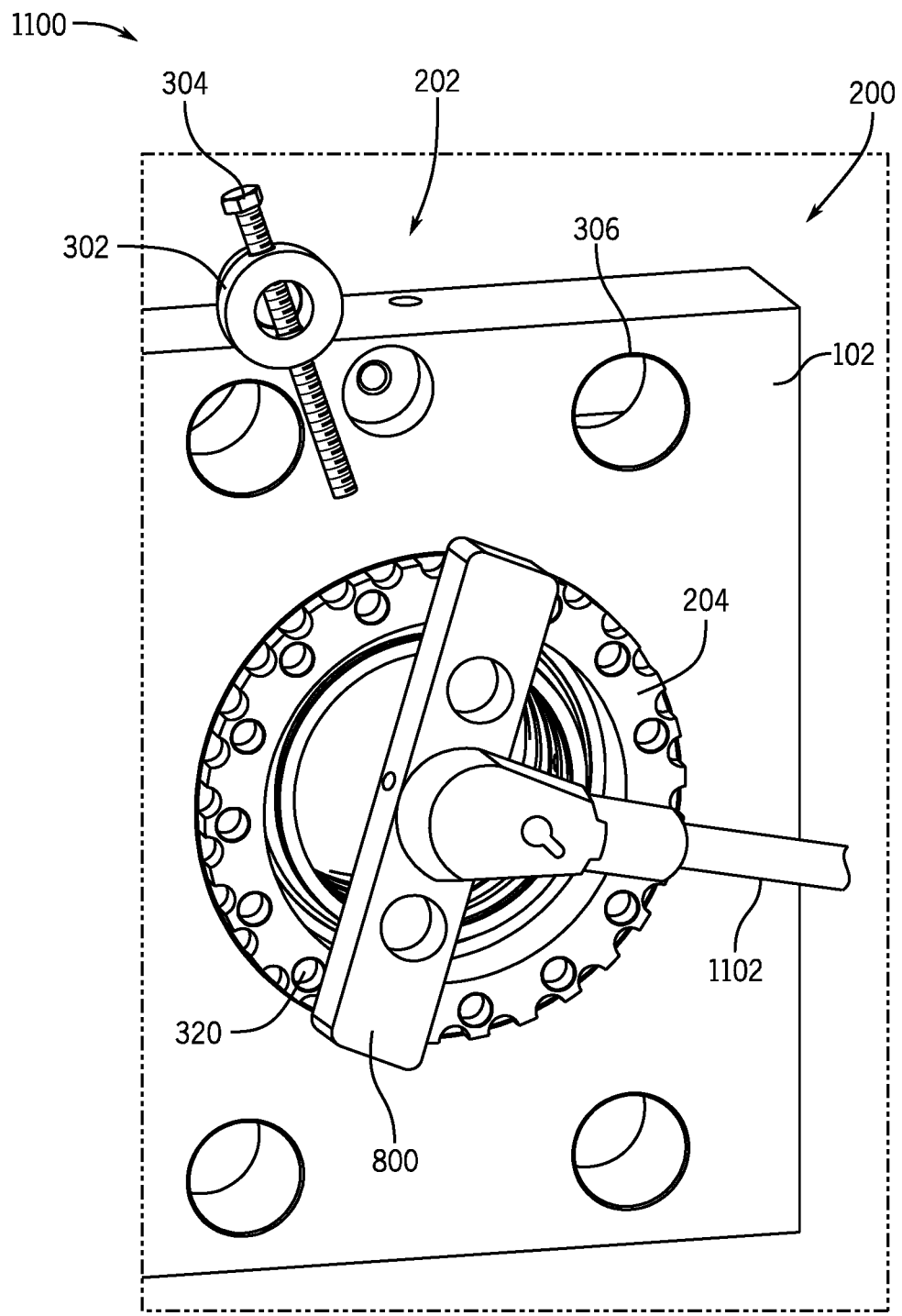

FIG. 11C illustrates the procedure 1100 of the installation of the wear sleeve retainer 204 using the lock body 800 and as associated tool 1102, which in this instance is a ratchet wrench. As shown, the anti-rotation system 202 is already installed within the aperture 306, for example, by bolting the locking mechanism 302 to the housing 102, among other options. The locking fastener 304 of the illustrated embodiment is positioned through the locking mechanism 302 and backed off such that the locking fastener 304 does not engage the wear sleeve retainer 204. Accordingly, the wear sleeve retainer 204 may be installed within the bore 400 by rotating the wear sleeve retainer 204 to a predetermined position indicative of engagement with the threads 530.

Figure 11D:
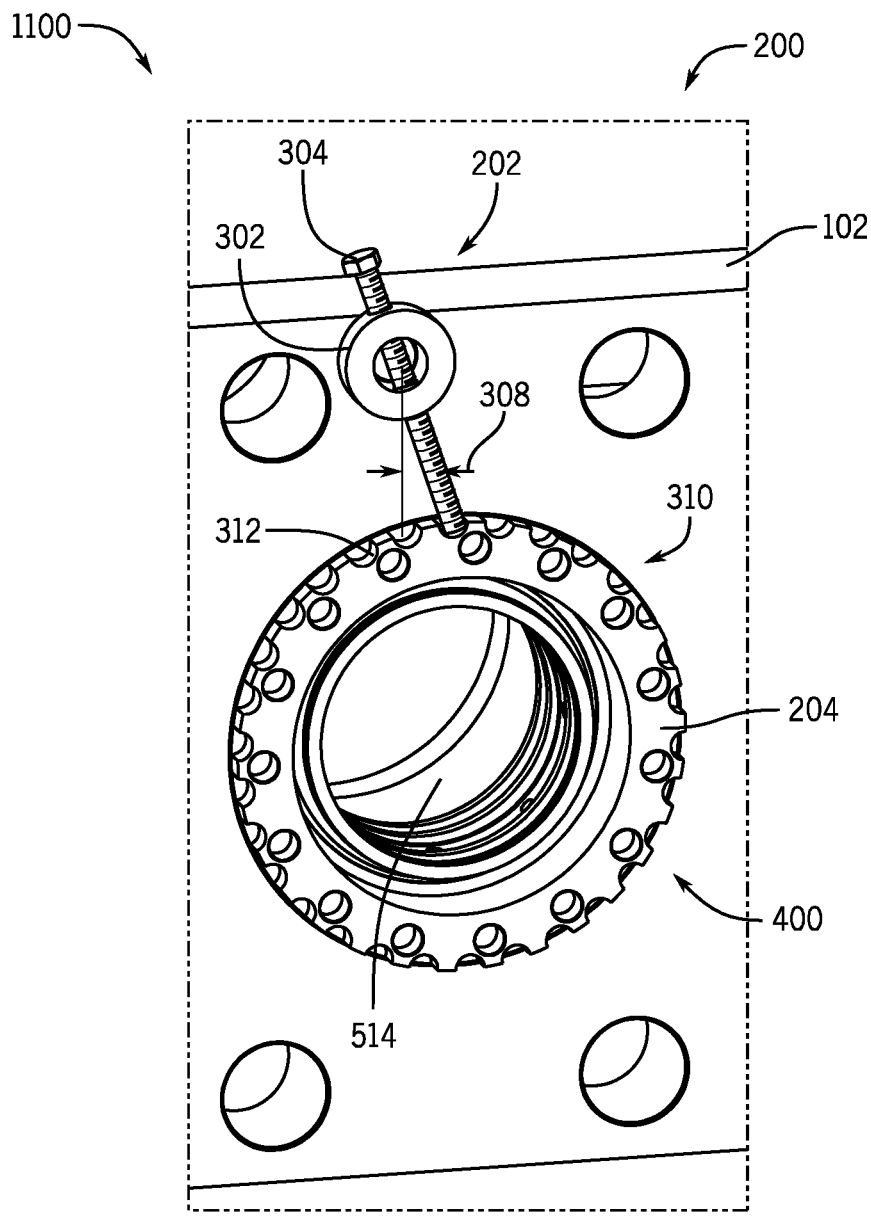

FIG. 11D illustrates the procedure 1100 of the engagement of the wear sleeve retainer 204 via the locking fastener 304. The locking fastener 304 extends through the locking mechanism 302 until it engages the valley 312. In various embodiments, the angle 308 is particularly selected to engage the wear sleeve retainer 204 at a predetermined location. This embodiment illustrates engagement between 12 o'clock and 1 o'clock positions, however, different configurations may also be utilized in various embodiments. Furthermore, while a single anti-rotation system 202 is shown for the illustrated plunger assembly 104, multiple anti-rotation systems 202 may be used, for example at different locations and/or the locking mechanism 302 may include multiple locking fasteners 304.

Figure 11E:
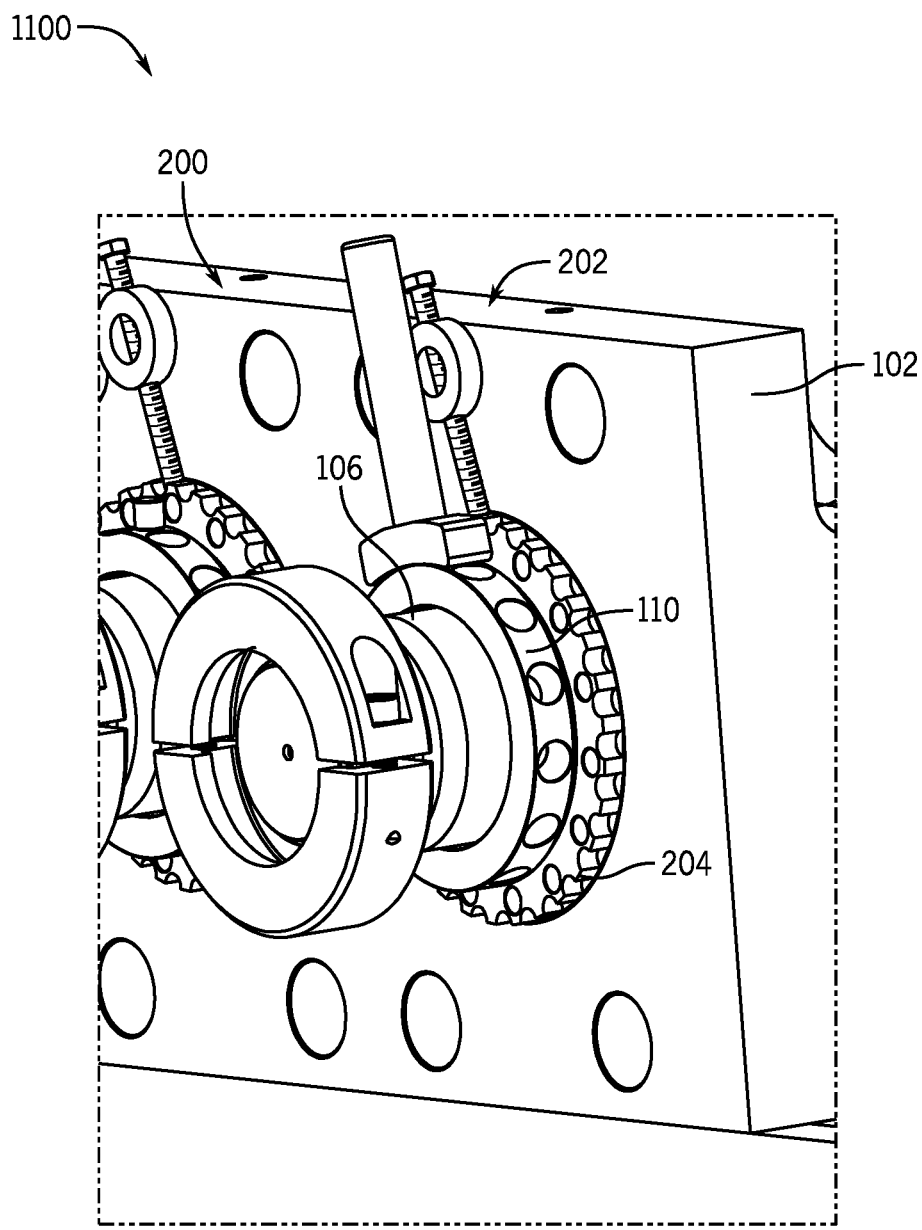

FIG. 11E illustrates the procedure 1100 of the packing nut 110 installed to engage the wear sleeve retainer 204, for example via the threads 554, 556 along with the plunger 106 installed within the plunger bore 402. In various embodiments, the packing 524 is installed prior to installation of the packing nut 110. It should be appreciated that components may be removed by reversing the steps described herein, for example, by removing the packing nut 110, removing the packing 524, disengaging the anti-rotation system 202, removing the wear sleeve retainer 204, and then removing the wear sleeve 514.

Figure 12A:
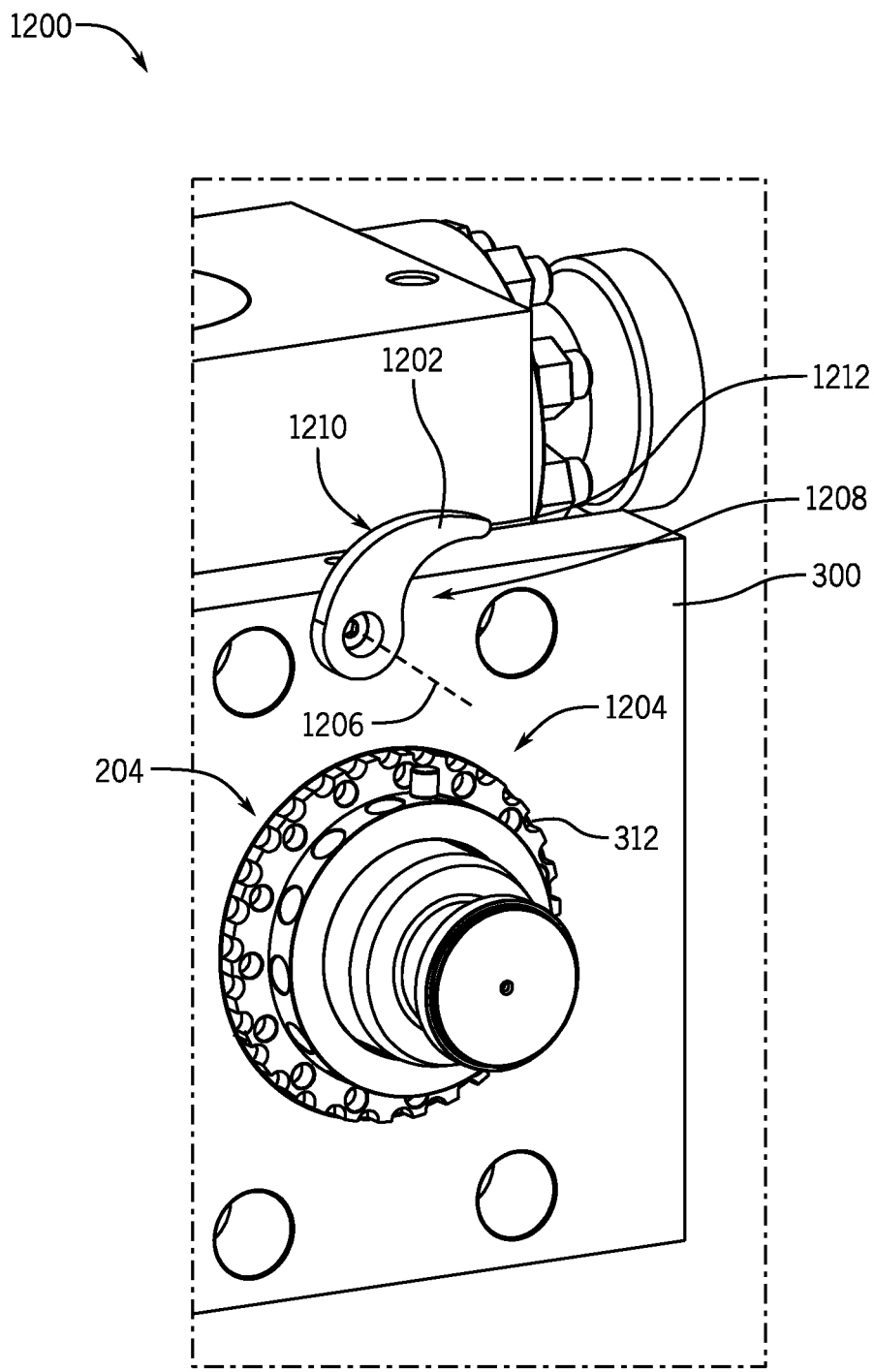
FIGS. 12A and 12B are perspective views of embodiments of a ratchet and pawl anti-rotation system, in accordance with embodiments of the present disclosure.

FIG. 12A is a perspective view of an embodiment of the anti-rotation system 202 using a ratchet and pawl system 1200. In this embodiment, the locking mechanism 302 and locking fastener 304 are replaced with a pawl 1202 while the circumferential profile 310 (e.g., the valleys 312 and flats) of the wear sleeve retainer 204 function as a ratchet 1204. It should be appreciated that, in various embodiments, the systems may be used interchangeably. By way of example, if there are 5 retainer systems 200 used on a fluid end 100, one or more may use the locking mechanism 302 and the locking fastener 304 and one or more may use the pawl 1202.

The illustrated pawl 1202 is coupled to the external face 300 of the fluid end 100, for example via the aperture 306, and is rotatable about a pawl axis 1206. The pawl 1202 includes an inner profile 1208 and an outer profile 1210. In this embodiment, the inner profile 1208 and outer profile 1210 are different, in that the inner profile 1208 has a more pronounced concave bend. It should be appreciated that inner and outer are used for illustrative and clarification purposes, and that such labels are not intended to limit embodiments of the present disclosure. For example, inner was selected in this instance because the inner profile 1208 is the leading edge of rotation about the pawl axis 1206 when moving the pawl 1202 into engagement with the ratchet 1204.

The illustrated pawl 1202 includes a contact region 1212, which is positioned to engage the valleys 312 of the wear sleeve retainer 204 (e.g., of the ratchet 1204). In operation, the pawl 1202 is rotated about the pawl axis 1206, in either a clockwise or counter-clockwise direction, to bring the contact region 1212 into the valleys 312. The pawl 1202 may be secured, such as via a fastener or spring to block rotation in an opposite direction, and as a result, block rotation of the wear sleeve retainer 204.

Figure 12B:
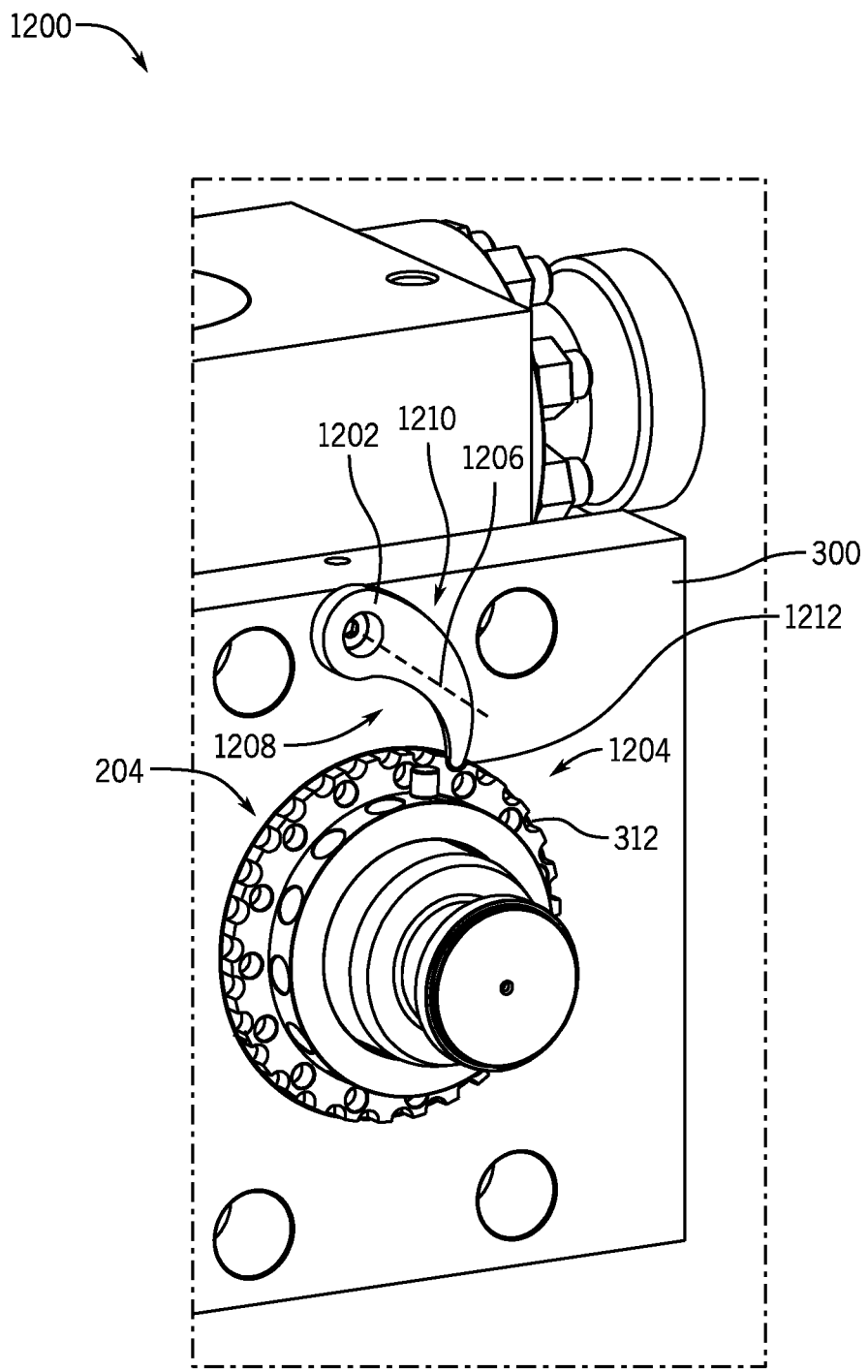

FIG. 12B is a perspective view of the ratchet and pawl system 1200 where the pawl 1202 has been rotated about the pawl axis 1206 to engage the ratchet 1204. Specifically, the contact region 1212 is positioned within the valley 312 after the pawl 1202 is rotated in the clockwise direction (compared to the position shown in FIG. 12A). As noted above, further rotation of the pawl 1202 may be blocked, for example via a fastener, spring or the like, and as a result, the pawl 1202 blocks rotation of the wear sleeve retainer 204 in the counter-clockwise direction. In this manner, the wear sleeve retainer 204 may be secured to the fluid end 100 without externally bolting through the wear sleeve retainer, as is done with current systems. This simplifies installation and reduces the number of bolts utilized at the site. It should be appreciated that, in other embodiments, rotation directions may be changed and still be within the scope of the present disclosure.

FIG. 13 is a flow chart of an embodiment of a method 1300 for installing a retainer system. It should be appreciated that this method, and all methods described herein, may include more or fewer steps. Additionally, the steps may be performed in a different order, or in parallel, unless otherwise specifically stated. The illustrated example includes installing the wear sleeve 1302. For example, the wear sleeve may be arranged within a bore. In various embodiments, one or more landing or locating features may be included to facilitate arrangement of the wear sleeve. The wear sleeve retainer is installed 1304. The wear sleeve retainer may be threaded to internal threads formed in a housing to eliminate external fasteners, which may be time consuming and difficult to install. An anti-rotation system may be utilized to block rotation of the wear sleeve retainer 1306. For example, a fastener may apply an opposing force to the wear sleeve retainer to prevent rotation in a direction that would cause the wear sleeve retainer to back off. In various embodiments, internal components are installed 1308, such as packing and the like. Then, a packing nut may be installed 1310, among other components, to enable operation of the pumping system.

Figure 14A:
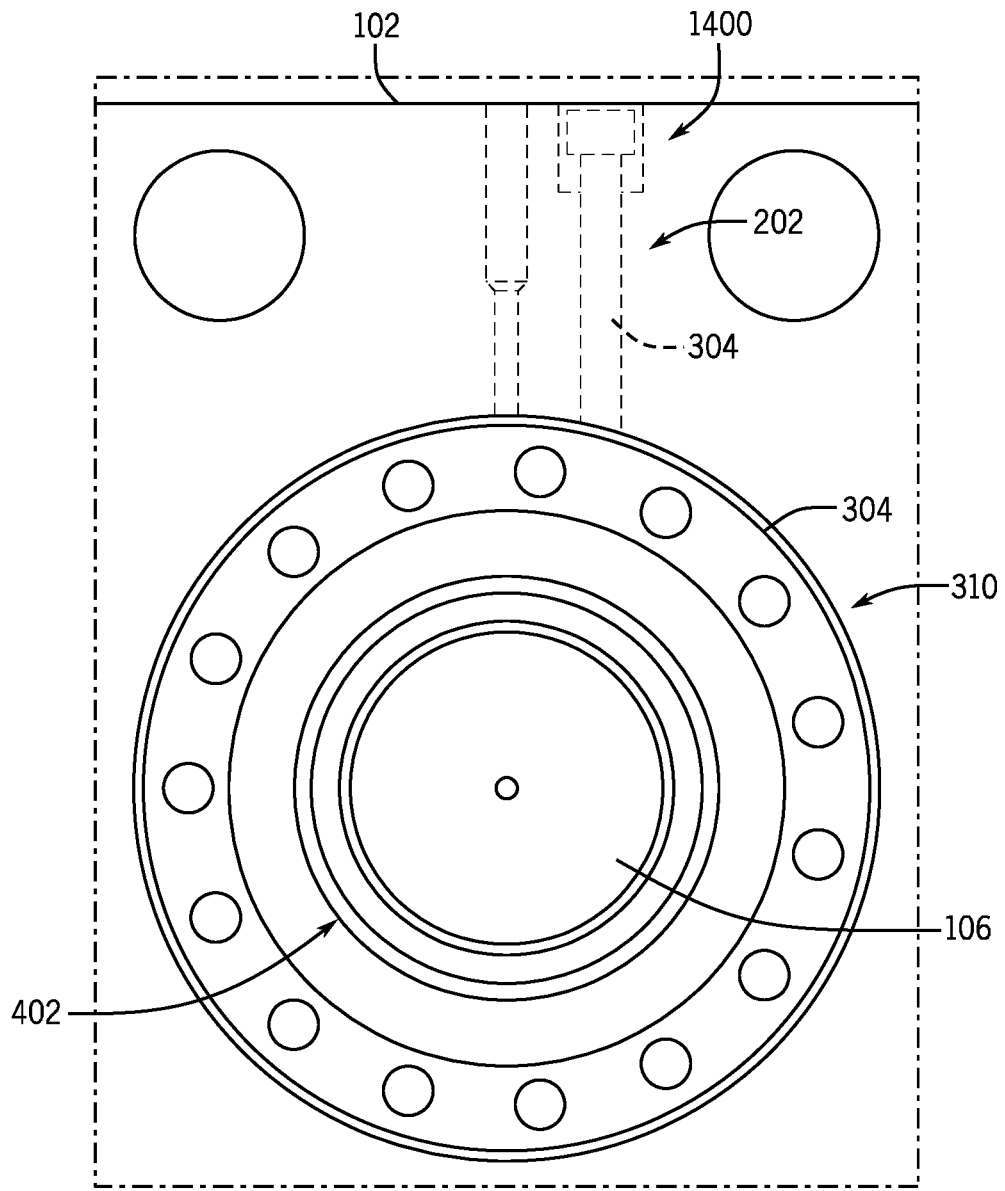
FIG. 14A is a front view of an embodiment of an anti-rotation system, in accordance with embodiments of the present disclosure.

FIG. 14A is a front view of an embodiment of the anti-rotation system 202 in which the locking fastener 304 extends through a portion of the housing 102. In this example, the wear sleeve retainer 204 is illustrated installed within the housing 102 with the plunger 106 extending through the plunger bore 402, as described above, such as in FIGS. 3 and 4. The wear sleeve retainer 204 may be threaded into the housing 102, as noted above, such that external fasteners are not used, or at least a reduced number of external fasteners are used. As such, the blinds 320 shown on the wear sleeve retainer 204 may be used with installation and removal, as noted herein.

In this example, the locking fastener 304 is positioned to extend through an aperture 1400 that extends through at least a portion of the housing 102. This example shows the housing in phantom for convenience and to more clearly illustrate the position of the locking fastener 304. For example, in at least one embodiment, the aperture 1400 is a counterbored opening that receives the locking fastener 304, such as a threaded fastener, that extends through the opening to engage the wear sleeve retainer 204. Threaded fasteners are provided as one example and are not intended to limit the scope of the present disclosure. Additional fasteners may include pins, tongue and groove fittings, bayonet connections, and the like. Furthermore, combinations of fasteners may be used and more than one fastener may be used to secure the wear sleeve retainer 204 into position. As shown, the locking fastener 304 engages the wear sleeve retainer along the profile 310, such as at either valleys 312 (not shown) and/or flats 314 (not shown), as noted above. In at least one embodiment, engagement may be within the housing 102 (e.g., not visible from an external portion of the housing 102) or may be outside of the housing 102.

Figure 14B:
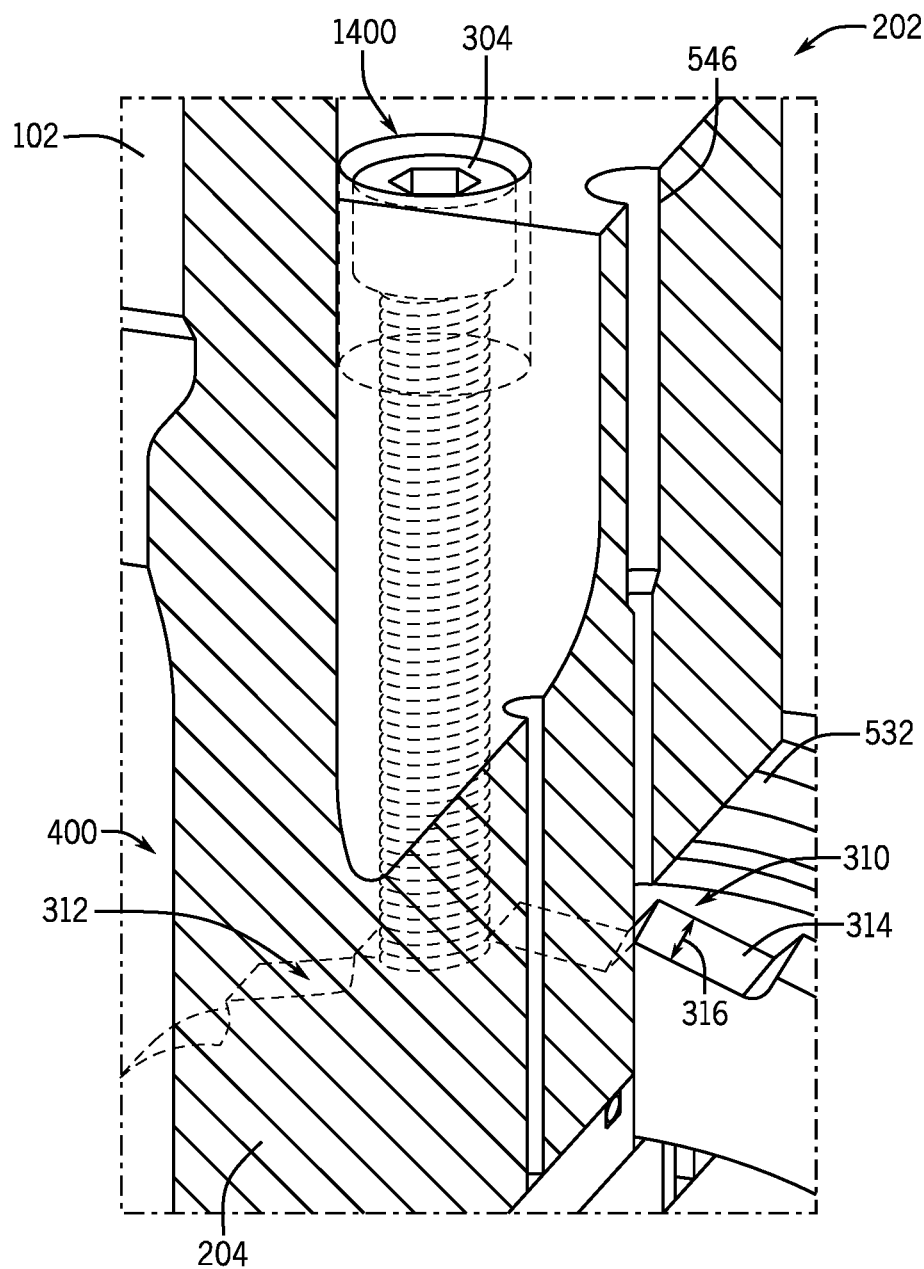
FIG. 14B is a partial perspective view of an embodiment of an anti-rotation system, in accordance with embodiments of the present disclosure.

FIG. 14B is a detailed perspective view of an embodiment of the anti-rotation system 202 in which a portion of the housing 102 is shown in phantom to illustrate interaction between the locking fastener 304 and the profile 310. In this example, the locking fastener 304 extends through the aperture 1400 to be positioned in alignment with a portion of the profile 310 such that rotation applied to the profile 310 (e.g., to the wear sleeve retainer 304) in a counter clockwise direction (from the perspective shown in FIG. 14B), will drive the flat 314 (or a portion thereof) into contact with the locking fastener 304, thereby preventing rotation of the wear sleeve retainer 304. As shown, and described herein, the profile 310 includes the series of flats 314 and valleys 312, where in this example the valleys 312 are not arcuate or curved like in FIG. 4, but are illustrated as substantially planar and in a stepped configuration with respect to the flats 314. As noted, a variety of different sizes for the flats 314 and valleys 312, as well as shapes, may be provided for various embodiments within the scope of the present disclosure.

As noted herein, the configuration of the profile 310 may permit installation of the locking fastener 304 at a variety of different positions. That is, there is not a single location associated with the locking fastener 304 in this illustrated embodiment. Instead, the locking fastener 304 may be positioned to interact with any of the flat/valley 314, 312 pairs in order to limit rotation of the wear sleeve retainer 204. It should be appreciated that various other embodiments may have a particular location for installation of the locking fastener 304.

The illustrated embodiment includes the aperture 1400 arranged proximate the port 546, but such a position is for illustrative purposes and not intended to limit the scope of the present disclosure. For example, the aperture 1400 can be on an underside of the housing 102, to the side, at an angle, or the like. Additionally, the aperture 1400 may be forwards of (e.g., closer to the face of the housing 102) or rewards of (e.g., farther from the face of the housing 102) than the port 546. The configuration of FIG. 14B shows the angle 308 (not pictured, shown in FIG. 3) to be approximately zero degrees (e.g., substantially perpendicular to the bore axis 402 (not pictured, shown in FIG. 4). This is in contrast to the angle 308 shown in FIGS. 3 and 4, but it should be appreciated that the aperture 1400 may also be formed at a different angle 308 to facilitate installation of the locking fastener 304 at an angle other than 0 degrees. The angle of the aperture 1400 may be based, at least in part, on the profile 310 configuration to facilitate force transfer to block rotational movement of the wear sleeve retainer 204.

In at least one embodiment, the profile 310 may be positioned axially inward, along the bore axis 402 (not pictured), compared to the threads 532. That is, the profile 310 may be arranged further from the exterior of the housing 102. However, in various other embodiments, the profile 310 may be positioned axially outward, along the bore axis 402, compared to the threads 532. It should be appreciated that the profile 310 may be arranged at various locations along the length of the wear sleeve retainer 304. In at least one embodiment, the depth 316 may be particularly selected to position an interface for engagement between the locking fastener 304 and the profile 310 within the bore 400. That is, the interaction may not be external to the housing 102, as shown in FIG. 4. However, it should be appreciated that an overhang or other component may be provided such that the engagement is external to the housing 102.

Figure 14C:
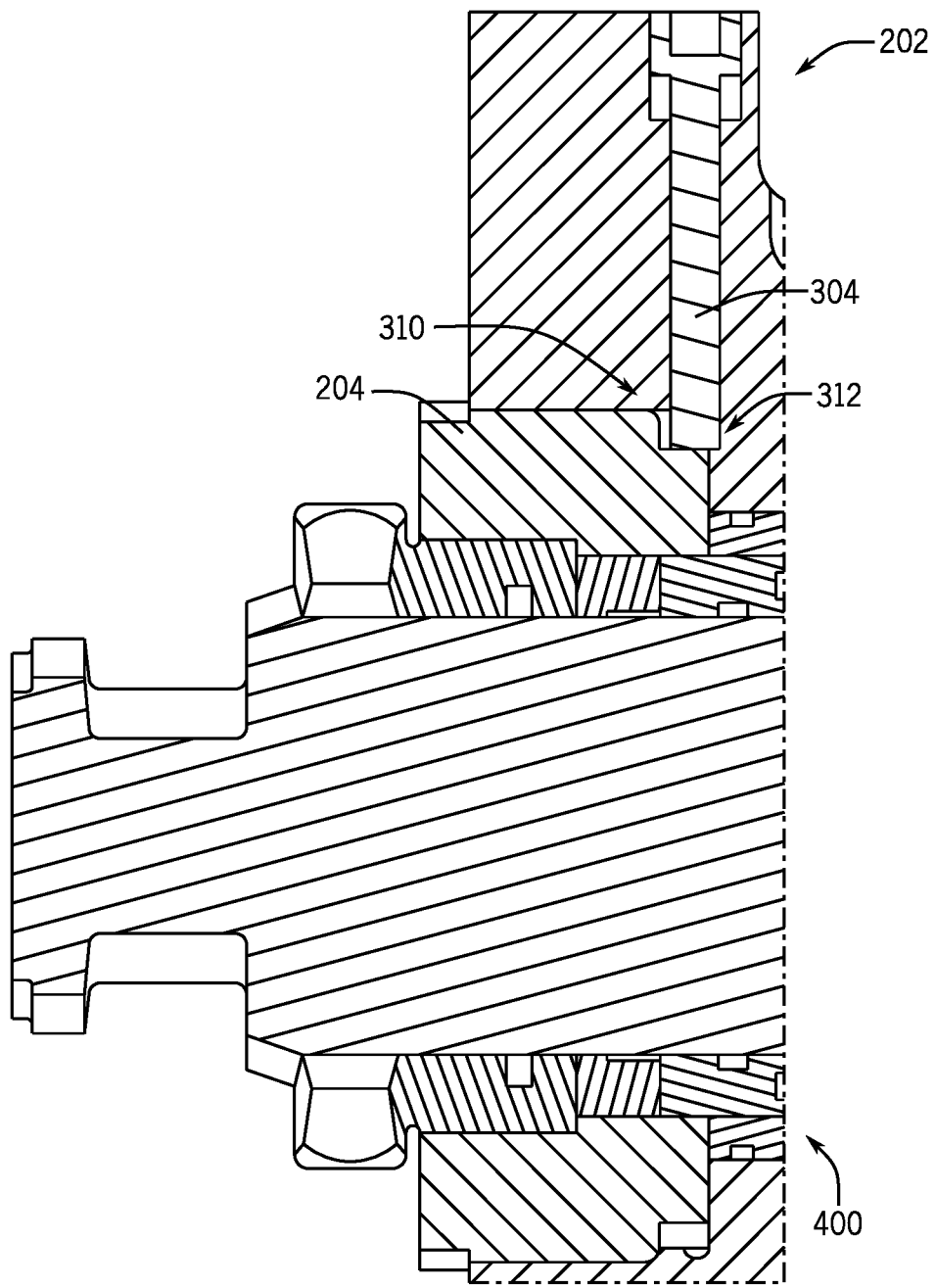
FIG. 14C is a cross-sectional view of an embodiment of an anti-rotation system, in accordance with embodiments of the present disclosure.

FIG. 14C is a cross-sectional view of an embodiment of the wear sleeve retainer 204 positioned within the bore 400 and secured into position by the locking fastener 304. In this configuration, engagement is formed within the bore 400 such that the interaction between the locking fastener 304 and the wear sleeve retainer 204 is not visible from an exterior portion of the housing 102. That is, the locking fastener 304 extends through the housing 102 to engage one or more portions of the wear sleeve retainer 204, such as the profile 310, which in this example may be arranged at an opposite end of the wear sleeve retainer when compared to the configurations of FIGS. 6 and 7. In other words, the profile 310 in the illustrated configuration may be positioned axially away from the front face of the wear ring retainer 304. It should be appreciated that the location of the profile 310 may vary based on one or more design considerations and that, in embodiments, the profile 310 may be closer to the front face than the position illustrated in FIG. 14C.

As shown, the wear sleeve retainer 204 includes the valley 312 for receiving the locking fastener 304. Accordingly, rotation of the wear ring retainer 204 will drive the associated flat 314 (not pictured) against the locking fastener 304, thereby blocking and/or resisting the rotation. In this manner, the wear sleeve retainer 204 may still be threaded into the housing 102, as noted above, to eliminate or reduce a number of external fasteners used to secure the wear sleeve retainer 204 to the housing 102.

Figure 15:
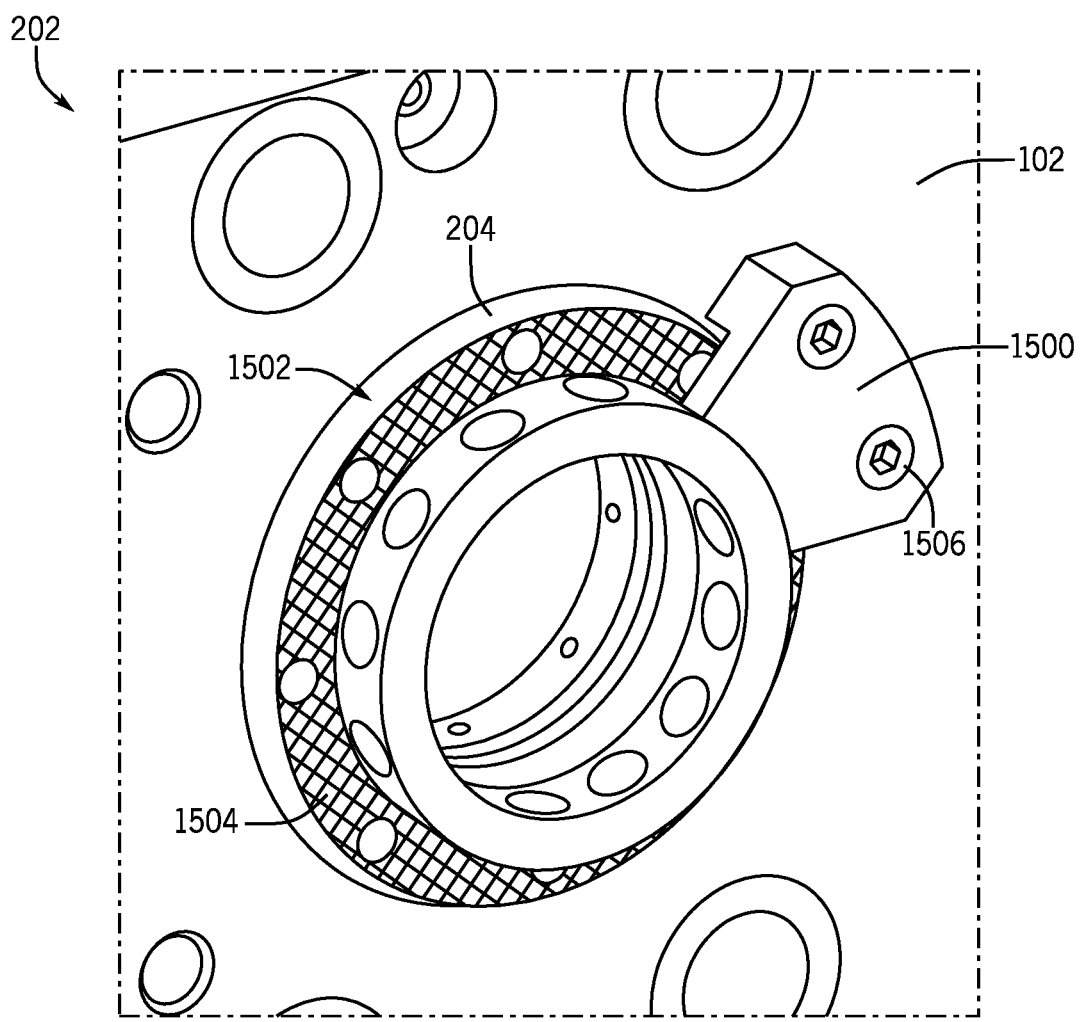
FIG. 15 is a perspective view of an embodiment of an anti-rotation system, in accordance with embodiments of the present disclosure.

FIG. 15 is a perspective view of an embodiment of the anti-rotation system 204 in which the locking fastener 304 is shown in the form of a pad retainer 1500. The pad retainer 1500 is positioned to bear against a front face 1502 of the wear sleeve retainer 204, for example against a textured surface 1504, to apply a frictional force to resist rotation of the wear sleeve retainer 204. In this example, the wear sleeve retainer 204 is secured to the housing 102 via one or more internal threads, as noted above. During operation, rotational forces may be applied to the wear sleeve retainer 204, which are undesirable for the reasons stated above. Accordingly, embodiments of the present disclosure may overcome those problems by providing the pad retainer 1500 to resist or block rotation of the wear sleeve retainer 204. The pad retainer 1500 may be secured to the housing 102, for example via one or more pad fasteners 1506. The pad fasteners 1506 may be threaded fasteners. As noted above, other wear sleeve retainers may include several fasteners to secure the wear sleeve retainers to an associated housing, but the illustrated embodiment includes two pad fasteners 1506, which may correspond to the locking mechanism 302 shown in FIG. 3, thereby reducing the time and components used. It should be appreciated that the two pad fasteners 1506 are shown by way of example only and are not intended to limit the scope of the present disclosure.

The textured surface 1504 may include knurling or one or more raised portions that interact with the pad retainer 1500 to generate friction, responsive to a rotational force applied to the wear sleeve retainer 304, to block rotation of the wear sleeve retainer 304. In at least one embodiment, the pad retainer 1500 may include a mating frictional surface (not visible) or may include a smooth surface, or some combination thereof. The pad retainer 1500 may be installed such that the pad retainer 1500 bears against the wear sleeve retainer 204, which may provide a visual indication to the operator regarding installation. Furthermore, rotation may also be identified by visual review if scratches or other marks are shown on the front face 1502, indicating rotation.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A wear sleeve retainer system, the system comprising:
   a wear sleeve retainer comprising:
   a body portion extending for a length and having a bore extending along an axis,
   a mating component extending from the body portion and into the bore, the mating component being annular and having a smaller diameter than a bore diameter of the bore of the body portion,
   threads arranged circumferentially about at least a portion of an outer diameter of the body portion, and
   a profile formed about at least a portion of the body portion, the profile including a plurality of receptacles; and
   a locking fastener adapted to engage one of the plurality of receptacles.

2. The wear sleeve retainer system of claim 1, wherein the body portion comprises a housing, and wherein the locking fastener extends through the housing having the bore.

3. The wear sleeve retainer system of claim 1, wherein the profile is arranged within the bore.

4. The wear sleeve retainer system of claim 1, wherein the profile includes sets of flats and valleys, and wherein respective flats of the sets of flats and valleys extend radially outward from respective valleys of the sets of flats and valleys.

5. The wear sleeve retainer system of claim 1, wherein the threads comprise first threads, and the wear retainer system further comprising:
   second threads arranged along the bore extending from a face of the body portion to the mating component.

6. The wear sleeve retainer system of claim 1, wherein the locking fastener comprises a threaded fastener.

7. The system of claim 1, wherein the threads comprise first threads, and the wear retainer system further comprising:
   second threads extending along at least a portion of the bore, the second threads ending prior to the mating component.

8. A fluid end comprising:
   a housing having a cavity, internal threads, and a bore extending toward the cavity;
   a wear sleeve positioned within the bore;
   a plunger bore extending in the wear sleeve;
   a plunger positioned within the plunger bore and operatively to reciprocate within the plunger bore;
   a wear sleeve retainer coupled to the housing and positioned to block axial movement of the wear sleeve, the wear sleeve retainer having external threads along a body that engage the internal threads of the housing;
   an anti-rotation system to engage the wear sleeve retainer to block rotation of the wear sleeve retainer in at least one direction; and
   a packing nut coupled to the wear sleeve retainer.

9. The fluid end of claim 8, wherein the anti-rotation system comprises:
   a locking fastener to engage the wear sleeve retainer, the locking fastener extending through the housing.

10. The fluid end of claim 8, wherein the anti-rotation system comprises:
    a pad retainer to be positioned to apply a force to a front face of the wear sleeve retainer.

11. The fluid end of claim 10, wherein one or more of the front face or the pad retainer includes a textured surface.

12. The fluid end of claim 8, wherein the wear sleeve retainer includes a profile positioned along an outer diameter to receive at least a portion of the anti-rotation system.

13. The fluid end of claim 12, wherein the profile is positioned within the bore when the wear sleeve retainer is installed within the bore.

14. The fluid end of claim 12, wherein the profile comprises a circumferential profile extending substantially around the wear sleeve retainer.

15. The fluid end of claim 8, wherein the wear sleeve retainer further comprises:
    at least a portion of the plunger bore, and
    a mating component extending into the plunger bore, the mating component having a smaller diameter than the plunger bore, the mating component also contacting the wear sleeve when the wear sleeve retainer is installed within the housing, thereby to block axial movement of the wear sleeve.

16. The fluid end of claim 8, wherein the wear sleeve retainer further comprises:
    a plurality of blinds arranged circumferentially about the face, the plurality of blinds positioned radially inward of the profile.

17. The fluid end of claim 14, further comprising:
    a lock body having an extension, the extension corresponding to at least one blind of the plurality of blinds, the lock body adapted to couple to a rotational tool, thereby to drive rotation of the wear sleeve retainer about an axis.

18. A method for installing a retainer system, the method comprising:
    positioning packing seal elements within a diameter of a wear sleeve when the wear sleeve is external to a fluid end housing;
    positioning the wear sleeve within a bore located in the fluid end housing;
    securing a wear sleeve retainer to the fluid end housing, the securing including the step of threading the wear sleeve retainer into the fluid end housing so that external threads on a body of the wear sleeve retainer engage internal threads in the bore and so that the wear sleeve retainer engages at least a portion of the wear sleeve; and securing an anti-rotation system to the wear sleeve retainer.

19. The method of claim 18, wherein the securing the anti-rotation system comprises:

engaging an outer profile of the wear sleeve retainer via a locking fastener, the locking fastener positioned to extend through the fluid end housing.

20. The method of claim 18, wherein the securing the anti-rotation system comprises:

engaging a front face of the wear sleeve retainer via a pad retainer, the pad retainer positioned to apply a frictional force to the wear sleeve retainer.

* * * * *